(12) United States Patent
Beall et al.

(10) Patent No.: US 9,751,798 B2
(45) Date of Patent: *Sep. 5, 2017

(54) WHITE, OPAQUE,β-SPODUMENE GLASS-CERAMIC ARTICLES WITH INHERENT DAMAGE RESISTANCE AND METHODS FOR MAKING THE SAME

(71) Applicant: CORNING INCORPORATED, Corning, NY (US)

(72) Inventors: George Halsey Beall, Big Flats, NY (US); Qiang Fu, Painted Post, NY (US); Charlene Marie Smith, Corning, NY (US); Randall Eugene Youngman, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/751,402

(22) Filed: Jun. 26, 2015

(65) Prior Publication Data

US 2015/0376054 A1 Dec. 31, 2015

Related U.S. Application Data

(60) Provisional application No. 62/018,936, filed on Jun. 30, 2014.

(51) Int. Cl.
| | |
|---|---|
| *C03C 10/12* | (2006.01) |
| *C03C 10/00* | (2006.01) |
| *C03B 32/02* | (2006.01) |
| *C03C 21/00* | (2006.01) |
| *C03C 3/093* | (2006.01) |

(52) U.S. Cl.
CPC .......... *C03C 10/0054* (2013.01); *C03B 32/02* (2013.01); *C03C 3/093* (2013.01); *C03C 10/0027* (2013.01); *C03C 21/002* (2013.01)

(58) Field of Classification Search
CPC ................................................ C03C 10/0027
See application file for complete search history.

(56) References Cited

U.S. PATENT DOCUMENTS

| | | | |
|---|---|---|---|
| 3,788,865 A | 1/1974 | Babcock et al. | |
| 3,907,577 A * | 9/1975 | Kiefer | C03C 10/0027 501/4 |
| 4,042,362 A * | 8/1977 | MacDowell | C03C 10/00 501/10 |
| 4,391,914 A | 7/1983 | Beall | |
| 5,173,453 A | 12/1992 | Beall et al. | |
| 7,476,633 B2 | 1/2009 | Comte et al. | |
| 8,664,130 B2 | 3/2014 | Beall et al. | |
| 2003/0054935 A1 | 3/2003 | Kitamura et al. | |
| 2005/0016521 A1 | 1/2005 | Witzmann et al. | |
| 2005/0153142 A1 | 7/2005 | Belykh et al. | |
| 2010/0035038 A1 | 2/2010 | Barefoot et al. | |
| 2012/0052271 A1 | 3/2012 | Gomez et al. | |
| 2012/0135848 A1 * | 5/2012 | Beall | C03C 10/0027 501/32 |
| 2013/0274085 A1 | 10/2013 | Beall et al. | |
| 2014/0057092 A1 | 2/2014 | Beall et al. | |
| 2015/0099124 A1 | 4/2015 | Beunet et al. | |
| 2015/0274581 A1 * | 10/2015 | Beall | C03C 10/0027 501/4 |
| 2015/0368147 A1 | 12/2015 | Dejneka et al. | |
| 2015/0376055 A1 * | 12/2015 | Fu | C03C 3/093 501/32 |

FOREIGN PATENT DOCUMENTS

| | | |
|---|---|---|
| DE | 3537561 A1 | 4/1986 |
| GB | 1018384 | 1/1966 |
| GB | 1095253 | 12/1967 |
| WO | 2014035791 | 3/2014 |
| WO | 2014120628 A2 | 8/2014 |

OTHER PUBLICATIONS

Patent Cooperation Treaty International Notification of Transmittal of the International Search Report and The Written Opinion of the International Searching Authority, international application No. PCT/US2015/038420: mailing date Sep. 24, 2015, 15 pages.
G. Beall, "Design and properties of glass-ceramics," Annu Rev Mater Sci, 1992, 22: 91-119.

* cited by examiner

*Primary Examiner* — Karl Group
(74) *Attorney, Agent, or Firm* — John T. Haran

(57) ABSTRACT

Crystallizable glasses, glass-ceramics, IXable glass-ceramics, and IX glass-ceramics are disclosed. The glass-ceramics exhibit β-spodumene ss as the predominant crystalline phase. These glasses and glass-ceramics, in mole %, include: 60-75 $SiO_2$; 10-18 $Al_2O_3$; 5-14 $Li_2O$; and 4.5 $B_2O_3$. The glass-ceramics also have a Vickers initiation crack threshold of at least about 25 kgf.

28 Claims, 11 Drawing Sheets

WHITE, OPAQUE, β-SPODUMENE GLASS-CERAMIC ARTICLES WITH INHERENT DAMAGE RESISTANCE AND METHODS FOR MAKING THE SAME

CROSS-REFERENCE TO RELATED APPLICATIONS

This application claims the benefit of priority under 35 U.S.C. §119 of U.S. Provisional Application Ser. No. 62/018,936 filed on Jun. 30, 2014 the content of which is relied upon and incorporated herein by reference in its entirety.

TECHNICAL FIELD

The present disclosure relates to crystallizable glasses (precursor glasses crystallizable to glass-ceramics), glass-ceramics, ion exchangeable ("IXable") glass-ceramics, and/or ion exchanged ("IX") glass-ceramics; processes for making the same; and articles comprising the same. In particular, the present disclosure relates to crystallizable glasses (precursor glasses formulated to be crystallizable to white, opaque glass-ceramics including β-spodumene solid solution as a predominant crystalline phase); white, opaque, β-spodumene glass-ceramics; IXable, white, opaque, β-spodumene glass-ceramics; and/or IX, white, opaque, β-spodumene glass-ceramics; processes for making the same; and articles comprising the same.

BACKGROUND

In the past decade, as electronic devices such as notebook computers, personal digital assistants (PDAs), portable navigation device (PNDs), media players, mobile phones, portable inventory devices (PIDs) . . . etc. (frequently referred to as "portable computing devices") have converged while at the same time becoming small, light, and functionally more powerful. One factor contributing to the development and availability of such smaller devices is an ability to increase computational density and operating speed by ever decreasing electronic component sizes. However, the trend to smaller, lighter, and functionally more powerful electronic devices presents a continuing challenge regarding design of some components of the portable computing devices.

Components associated with portable computing devices encountering particular design challenges include the enclosure or housing used to house the various internal/electronic components. This design challenge generally arises from two conflicting design goals—the desirability of making the enclosure or housing lighter and thinner, and the desirability of making the enclosure or housing stronger and more rigid. Lighter enclosures or housings, typically thin plastic structures with few fasteners, tend to be more flexible while having a tendency to buckle and bow as opposed to stronger and more rigid enclosure or housings, typically thicker plastic structures with more fasteners having more weight. Unfortunately, the increased weight of the stronger, more rigid plastic structures might lead to user dissatisfaction, while the bowing and buckling of the lighter structures might damage the internal/electronic components of the portable computing devices and almost certainly lead to user dissatisfaction.

Among known classes of materials are glass-ceramics that are used widely in various other applications. For example, glass-ceramics are used widely in kitchens as cooktops, cookware, and eating utensils, such as bowls, dinner plates, and the like. Transparent glass-ceramics are used in the production of oven and/or furnace windows, optical elements, mirror substrates, and the like. Glass-ceramics are typically made by crystallizing crystallizable glasses at specified temperatures for specified periods of time to nucleate and grow crystalline phases in a glass matrix. Two glass-ceramics based on the $SiO_2$—$Al_2O_3$—$Li_2O$ glass system comprise those having either β-quartz solid solution ("β-quartz ss" or "β-quartz") as the predominant crystalline phase or β-spodumene solid solution ("β-spodumene ss" or "β-spodumene") as the predominant crystalline phase.

As stated, in view of the foregoing problems with existing enclosures or housings, there exists a need for materials such as crystallizable glasses (precursor glasses formulated to be crystallizable to glass-ceramics) and/or β-spodumene glass-ceramics and/or IXable, β-spodumene glass-ceramics and/or IX, β-spodumene glass-ceramics that provide, potentially in a more cost effective manner, improved enclosures or housings for portable computing devices. Also, there exists a need for such materials that provide improved whiteness levels and/or opaque colors while addressing in an aesthetically pleasing manner the design challenges of creating light, strong, and rigid enclosures or housings.

SUMMARY

Some aspects of embodiments and/or embodiments ("aspects and/or embodiments") of this disclosure relate to crystallizable glasses formulated to be crystallizable to white, opaque, β-spodumene glass-ceramics having β-spodumene as the predominant crystalline phase. Such crystallizable glasses, in mole percent (mole %), include: $SiO_2$ in a range from about 60 to about 75; $Al_2O_3$ in a range from about 10 to about 18; $Li_2O$ in a range from about 5 to about 14; and $B_2O_3$ in a range from about 4.5 to about 20; while in alternative aspects, in mole %, including: $SiO_2$ in a range from about 60 to about 75; $Al_2O_3$ in a range from about 10 to about 18; $Li_2O$ in a range from about 5 to about 14; $B_2O_3$ in a range from about 4.5 to about 20; MgO in a range from 0 to about 8; ZnO in a range from 0 to about 4; $TiO_2$ in a range from about 2 to about 5; $Na_2O$ in a range from 0 to about 5; $K_2O$ in a range from 0 to about 4; and $SnO_2$ in a range from about 0.05 to about 0.5; while in further alternative aspects, in mole %, including: $SiO_2$ in a range from about 60 to about 70; $Al_2O_3$ in a range from about 10 to about 16; $Li_2O$ in a range from about 7 to about 10; $B_2O_3$ in a range from about 6 to about 8; MgO in a range from 2 to about 5; ZnO in a range from about 1 to about 2; $TiO_2$ in a range from about 3 to about 4; $Na_2O$ in a range from about 0.2 to about 0.5; and $SnO_2$ in a range from about 0.2 to about 0.5.

Some other aspects and/or embodiments of this disclosure relate to white, opaque, β-spodumene glass-ceramics having β-spodumene as the predominant crystalline phase. Such white, opaque, β-spodumene glass-ceramics, in mole %, include: $SiO_2$ in a range from about 60 to about 75; $Al_2O_3$ in a range from about 10 to about 18; $Li_2O$ in a range from about 5 to about 14; $B_2O_3$ in a range from about 4.5 to about 20; while in alternative aspects, in mole %, including: $SiO_2$ in a range from about 60 to about 75; $Al_2O_3$ in a range from about 10 to about 18; $Li_2O$ in a range from about 5 to about 14; $B_2O_3$ in a range from about 4.5 to about 20; MgO in a range from 0 to about 8; ZnO in a range from 0 to about 4; $TiO_2$ in a range from about 2 to about 5; $Na_2O$ in a range from 0 to about 5; $K_2O$ in a range from 0 to about 4; and $SnO_2$ in a range from about 0.05 to about 0.5, while in further alternative aspects, in mole %, including: $SiO_2$ in a range from about 60 to about 70; $Al_2O_3$ in a range from about 10 to about 16; $Li_2O$ in a range from about 7 to about 10; $B_2O_3$ in a range from about 6 to about 8; MgO in a range from 2 to about 5; ZnO in a range from about 1 to about 2; $TiO_2$ in a range from about 3 to about 4; $Na_2O$ in a range from about 0.2 to about 0.5; and $SnO_2$ in a range from about 0.2 to about 0.5.

In some aspects and/or embodiments of this disclosure, such glass-ceramics can have inherent damage resistance with a Vickers crack initiation threshold of at least about 25 kgf, at least about 30 kgf, at least about 35 kgf, at least about 40 kgf, at least about 45 kgf, or at least about 50 kgf.

Still other aspects and/or embodiments of this disclosure relate to methods for forming crystallizable glasses formulated to be crystallizable to white, opaque, β-spodumene glass-ceramics and methods for forming white, opaque, β-spodumene glass-ceramics having a β-spodumene as the predominant crystalline phase. In aspects, some methods included melting a mixture of raw materials formulated to produce upon melting crystallizable glasses, in mole %, including: $SiO_2$ in a range from about 60 to about 75; $Al_2O_3$ in a range from about 10 to about 18; $Li_2O$ in a range from about 5 to about 14; $B_2O_3$ in a range from about 4.5 to about 20; while in alternative aspects, in mole %, including: $SiO_2$ in a range from about 60 to about 75; $Al_2O_3$ in a range from about 10 to about 18; $Li_2O$ in a range from about 5 to about 14; $B_2O_3$ in a range from about 4.5 to about 20; MgO in a range from 0 to about 8; ZnO in a range from 0 to about 4; $TiO_2$ in a range from about 2 to about 5; $Na_2O$ in a range from 0 to about 5; $K_2O$ in a range from 0 to about 4; and $SnO_2$ in a range from about 0.05 to about 0.5, while in further alternative aspects, in mole %, including: $SiO_2$ in a range from about 60 to about 70; $Al_2O_3$ in a range from about 10 to about 16; $Li_2O$ in a range from about 7 to about 10; $B_2O_3$ in a range from about 6 to about 8; MgO in a range from 2 to about 5; ZnO in a range from about 1 to about 2; $TiO_2$ in a range from about 3 to about 4; $Na_2O$ in a range from about 0.2 to about 0.5; and $SnO_2$ in a range from about 0.2 to about 0.5. In some aspects and/or embodiments of this disclosure, such glass-ceramics can have inherent damage resistance with a Vickers crack initiation threshold of at least about 25 kgf, at least about 30 kgf, at least about 35 kgf, at least about 40 kgf, at least about 45 kgf, or at least about 50 kgf.

In further aspects, some other methods include methods for forming glass-ceramics having a β-spodumene as the predominant crystalline phase by transforming crystallizable glasses. Such other methods including (i) heating a crystallizable glass formulated to be crystallizable to a glass-ceramic having a β-spodumene as the predominant crystalline phase at a rate of 1-10° C./min to a nucleation temperature (Tn) ranging between 700° C. and 810° C.; (ii) maintaining the crystallizable glass at the nucleation temperature to produce a glass article comprising and/or a nucleated crystallizable glass; (iii) heating the nucleated crystallizable glass at a rate of 1-10° C./min to a crystallization temperature (Tc) ranging between 850° C. and 1200° C.; (iv) maintaining the nucleated crystallizable glass at the crystallization temperature to produce glass-ceramic having a β-spodumene as the predominant crystalline phase.

The article comprising and/or white, opaque, β-spodumene glass-ceramics, IXable, white, opaque, β-spodumene glass-ceramics, and/or IX, white, opaque, β-spodumene glass-ceramics might be used in a variety of electronic devices or portable computing devices, which might be configured for wireless communication, such as, computers and computer accessories, such as, "mice", keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers, tablets, thumb drives, external drives, whiteboards . . . etc.; personal digital assistants (PDAs); portable navigation device (PNDs); portable inventory devices (PIDs); entertainment devices and/or centers, devices and/or center accessories such as, tuners, media players (e.g., record, cassette, disc, solid-state . . . etc.), cable and/or satellite receivers, keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers . . . etc.; electronic reader devices or e-readers; mobile or smart phones . . . etc. As alternative examples, white, opaque, β-spodumene glass-ceramics, IXable, white, opaque, β-spodumene glass-ceramics, and/or IX, white, opaque, β-spodumene glass-ceramics might be used in automotive, appliances, and even architectural applications.

Numerous other aspects of embodiments, features, and advantages of this disclosure will appear from the following description and the accompanying drawings. In the description and/or the accompanying drawings, reference is made to exemplary aspects and/or embodiments of this disclosure which can be applied individually or combined in any way with each other. Such aspects and/or embodiments do not represent the full scope of this disclosure. Reference should therefore be made to the claims herein for interpreting the full scope of this disclosure. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a recitation in this disclosure of a range of from about 1 to 5 shall be considered to support claims to any of the following ranges: 1-5; 1-4; 1-3; 1-2; 2-5; 2-4; 2-3; 3-5; 3-4; and 4-5. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of this disclosure will become apparent from the following description, the accompanying drawings, and the appended claims.

DETAILED DESCRIPTION

Figure 1:
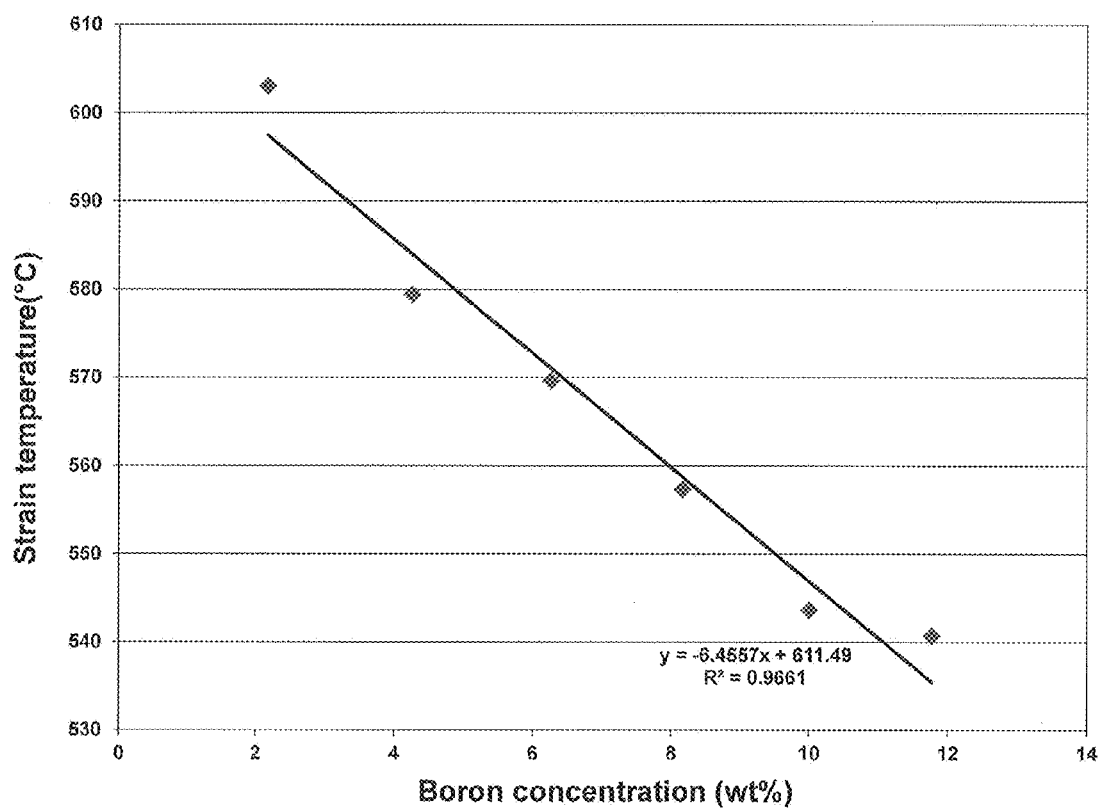
FIG. 1 shows a plot of the boron oxide concentration in weight % vs. the strain temperature (° C.)

In the following description of exemplary aspects and/or embodiments of this disclosure, reference is made to the accompanying drawings that form a part hereof, and in which are shown by way of illustration specific aspects and/or embodiments in which this disclosure may be practiced. While these aspects and/or embodiments are described in sufficient detail to enable those skilled in the art to practice this disclosure, it will nevertheless be understood that no limitation of the scope of this disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other aspects and/or embodiments may be utilized, logical changes (e.g., without limitation, any one or more of chemical, compositional {e.g., without limitation, any one or more of chemicals, materials, . . . and the like}, electrical, electrochemical, electromechanical, electro-optical, mechanical, optical, physical, physiochemical, . . . and the like) and other changes may be made without departing from the spirit or scope of this disclosure. Accordingly, the following description is not to be taken in a limiting sense and the scope of aspects and/or embodiments of this disclosure are defined by the appended claims. It is also understood that terms such as "top," "bottom," "outward," "inward," . . . and the like are words of convenience and are not to be construed as limiting terms. Also, unless otherwise specified herein, a range of values includes both the upper and lower limits of the range. For example, a range of between about 1-10 mole % includes the values of 1 mole % and 10 mole %. In addition, as used herein, the term "about" modifying a number means within 10% of the reported numerical value.

As noted, various aspects and/or embodiments of this disclosure relate to an article and/or machine or equipment formed from and/or including one or more of white, opaque, β-spodumene glass-ceramics; IXable, white, opaque, β-spodumene glass-ceramics; and/or IX, white, opaque, β-spodumene glass-ceramics of this disclosure. As one example, white, opaque, β-spodumene glass-ceramics; IXable, white, opaque, β-spodumene glass-ceramics; and/or IX, white, opaque, β-spodumene glass-ceramics might be used in a variety of electronic devices or portable computing devices, which might be configured for wireless communication, such as, computers and computer accessories, such as, "mice", keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers, tablets, thumb drives, external drives, whiteboards . . . etc.; personal digital assistants (PDAs); portable navigation device (PNDs); portable inventory devices (PIDs); entertainment devices and/or centers; devices and/or center accessories such as, tuners, media players (e.g., record, cassette, disc, solid-state . . . etc.), cable and/or satellite receivers, keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers . . . etc.; electronic reader devices or e-readers; mobile or smart phones . . . etc. As alternative examples, white, opaque, β-spodumene glass-ceramics; IXable, white, opaque, β-spodumene glass-ceramics; and/or IX, white, opaque, β-spodumene glass-ceramics might be used in automotive, appliances, and even architectural applications. To that end, it is desirable that crystallizable glasses thereto are formulated to have a sufficiently low softening point and/or a sufficiently low coefficient of thermal expansion so as to be compatible with manipulation into complex shapes.

White, opaque, β-spodumene glass-ceramics having β-spodumene as the predominant crystalline phase and crystallizable glasses formulated to be crystallized to white, opaque, β-spodumene glass-ceramics having β-spodumene as the predominant crystalline phase according to aspects and/or embodiments of this disclosure, in mole %, include: $SiO_2$ in a range from about 60 to about 75; $Al_2O_3$ in a range from about 10 to about 18; $Li_2O$ in a range from about 5 to about 14; $B_2O_3$ in a range from about 4.5 to about 20; while in alternative aspects, in mole %, includes: $SiO_2$ in a range from about 60 to about 75; $Al_2O_3$ in a range from about 10 to about 18; $Li_2O$ in a range from about 5 to about 14; $B_2O_3$ in a range from about 4.5 to about 20; MgO in a range from 0 to about 8; ZnO in a range from 0 to about 4; $TiO_2$ in a range from about 2 to about 5; $Na_2O$ in a range from 0 to about 5; $K_2O$ in a range from 0 to about 4; and $SnO_2$ in a range from about 0.05 to about 0.5. In alternative aspects, in mole %, $B_2O_3$ is in a range from about 4 to about 20, about 4 to about 18, about 4 to about 16, about 4 to about 14, about 4 to about 12, about 4 to about 10, about 4 to about 8, about 4.1 to about 20, about 4.1 to about 18, about 4.1 to about 16, about 4.1 to about 14, about 4.1 to about 12, about 4.1 to about 10, about 4.1 to about 8, about 4.2 to about 20, about 4.2 to about 18, about 4.2 to about 16, about 4.2 to about 14, about 4.2 to about 12, about 4.2 to about 10, about 4.2 to about 8, about 4.3 to about 20, about 4.3 to about 18, about 4.3 to about 16, about 4.3 to about 14, about 4.3 to about 12, about 4.3 to about 10, about 4.3 to about 8, about 4.4 to about 20, about 4.4 to about 18, about 4.4 to about 16, about 4.4 to about 14, about 4.4 to about 12, about 4.4 to about 10, about 4.4 to about 8, about 4.5 to about 20, about 4.3 to about 18, about 4.5 to about 16, about 4.5 to about 14, about 4.5 to about 12, about 4.5 to about 10, about 4.5 to about 8, about 4.6 to about 20, about 4.6 to about 18, about 4.6 to about 16, about 4.6 to about 14, about 4.6 to about 12, about 4.6 to about 10, about 4.6 to about 8, about 4.7 to about 20, about 4.7 to about 18, about 4.7 to about 16, about 4.7 to about 14, about 4.7 to about 12, about 4.7 to about 10, about 4.7 to about 8, about 4.8 to about 20, about 4.8 to about 18, about 4.8 to about 16, about 4.8 to about 14, about 4.8 to about 12, about 4.8 to about 10, about 4.8 to about 8, about 4.9 to about 20, about 4.9 to about 18, about 4.9 to about 16, about 4.9 to about 14, about 4.9 to about 12, about 4.9 to about 10, about 4.9 to about 8, about 5 to about 20, about 5 to about 18, about 5 to about 16, about 5 to about 14, about 5 to about 12, about 5 to about 10, about 5 to about 8, about 5.1 to about 20, about 5.1 to about 18, about 5.1 to about 16, about 5.1 to about 14, about 5.1 to about 12, about 5.1 to about 10, about 5.1 to about 8, about 5.2 to about 20, about 5.2 to about 18, about 5.2 to about 16, about 5.2 to about 14, about 5.2 to about 12, about 5.2 to about 10, about 5.2 to about 8, about 5.3 to about 20, about 5.3 to about 18, about 5.3 to about 16, about 5.3 to about 14, about 5.3 to about 12, about 5.3 to about 10, about 5.3 to about 8, about 5.4 to about 20, about 5.4 to about 18, about 5.4 to about 16, about 5.4 to about 14, about 5.4 to about 12, about 5.4 to about 10, about 5.4 to about 8, about 5.5 to about 20, about 5.5 to about 18, about 5.5 to about 16, about 5.5 to about 14, about 5.5 to about 12, about 5.5 to about 10, about 5.5 to about 8, about 5.6 to about 20, about 5.6 to about 18, about 5.6 to about 16, about 5.6 to about 14, about 5.6 to about 12, about 5.6 to about 10, about 5.6 to about 8, about 5.7 to about 20, about 5.7 to about 18, about 5.7 to about 16, about 5.7 to about 14, about 5.7 to about 12, about 5.7 to about 10, about 5.7 to about 8, about 5.8 to about 20, about 5.8 to about 18, about 5.8 to about 16, about 5.8 to about 14, about 5.8 to about 12, about 5.8 to about 10, about 5.8 to about 8, about 5.9 to about 20, about 5.9 to about 18, about 5.9 to about 16, about 5.9 to about 14, about 5.9 to about 12, about 5.9 to about 10, about 5.9 to about 8, about 6 to about 18, about 6 to about 16, about 6 to about 14, about 6 to about 12, about 6 to about 10, about 6 to about 8, about 6.5 to about 20, about 6.5 to about 18, about 6.5 to about 16, about 6.5 to about 14, about 6.5 to about 12, about 6.5 to about 10, about 6.5 to about 8, about 7 to about 20, about 7 to about 18, about 7 to about 16, about 7 to about 14, about 7 to about 12, about 7 to about 10, about 8 to about 20, about 8 to about 18, about 8 to about 16, about 8 to about 14, about 8 to about 12, about 8 to about 10, about 10 to about 20, or about 10 to about 15.

In alternative aspects, white, opaque, β-spodumene glass-ceramics having β-spodumene as the predominant crystalline phase and crystallizable glasses formulated to be crystallized to white, opaque, β-spodumene glass-ceramics having β-spodumene as the predominant crystalline phase according to aspects and/or embodiments of this disclosure, in mole %, include: $SiO_2$ in a range from about 60 to about 70; $Al_2O_3$ in a range from about 10 to about 16; $Li_2O$ in a range from about 7 to about 10; $B_2O_3$ in a range from about 6 to about 8; MgO in a range from about 2 to about 5; ZnO in a range from about 1 to about 2; $TiO_2$ in a range from about 3 to about 4; $Na_2O$ in a range from about 0.4 to about 0.6; and $SnO_2$ in a range from about 0.2 to about 0.5. In additional alternative aspects, $Li_2O$ is in a range from about 9 mole % to about 11 mole %. In other additional alternative aspects, the white, opaque, β-spodumene glass-ceramics having β-spodumene as the predominant crystalline phase and crystallizable glasses formulated to be crystallized to white, opaque, β-spodumene glass-ceramics having β-spodumene as the predominant crystalline phase can also include $ZrO_2$ in a range from 0 to about 3 mole %.

In some aspects, glass-ceramics having the above compositions have inherent damage resistance with a Vickers crack initiation threshold of at least about 25 kilogram-force (kgf), at least about 30 kgf, at least about 35 kgf, at least about 40 kgf, at least about 45 kgf, or at least about 50 kgf. The terms Vickers crack initiation threshold and Vickers indentation fracture threshold are used interchangeably herein. The high amounts of $B_2O_3$ (e.g., above 6 mole %) is believed to increase the damage resistance because the boron in the residual glass is not charge balanced by alkali oxides or divalent cation oxides. As a result, the boron will be predominantly in a three-fold coordination state (boron cations surrounded by three anions) rather than a four-fold coordination state (boron cations surrounded by four anions). The connectivity of three-fold coordinated boron is less than that of four-fold coordinated boron state so that three-fold coordinated boron can be more readily deformed when compressed, thus providing greater intrinsic or native damage resistance. Thus, in some aspects the $B_2O_3$ contains three-fold coordinated boron cations. In some aspects, at least 50% of the $B_2O_3$ present in the residual glass, at least 65% of the $B_2O_3$ present in the residual glass, or at least 70% of the $B_2O_3$ present in the residual glass can be three-fold coordination boron cations.

In some aspects, such glass-ceramics and crystallizable glasses exhibit the following compositional criteria:

the ratio of:

the mole sum total of $[Li_2O + Na_2O + K_2O + MgO + ZnO]$ to the moles of $[Al_2O_3]$ can be in a range from about 0.8 to about 1.5.

By formulating crystallizable glasses to have prespecified values of this ratio, it is possible to maximize the β-spodumene in the glass-ceramics made using such crystallizable glasses.

In some additional aspects, such glass-ceramics exhibit the following crystal phase assemblage:
 (1) β-spodumene solid solutions exhibiting $Li_2O:Al_2O_3:SiO_2$ ratios ranging from 1:1:4.5-1:1:8 or, alternatively, from 1:1:4.5-1:1:7, and comprising at least 70 wt % of the crystalline phase;
 (2) at least one Ti-containing crystalline phase comprising:
  a. about 2.5-8 wt % of the crystalline phases of the glass-ceramic,
  b. an acicular morphology exhibiting a length ≥about 50 nm, and
  c. rutile; and optionally,
 (3) One or more crystalline phases exhibiting a spinel structure and comprising 1-10 wt % of the crystalline phase.

In further aspects, such glass-ceramics exhibit opaqueness and/or an opacity ≥85% for a 0.8 mm thickness over the wavelength range of 400 nm-700 nm.

In still further aspects, when measurement results obtained between about 350 nm-800 nm are presented in CIELAB color space coordinates for a CIE illuminant F02, such glass-ceramics exhibit a level of lightness (L*) ranging from about 80 to about 98 or from about 91 to about 94. In additional aspects and again presenting the results in CIELAB color space coordinates for a CIE illuminant F02, such glass ceramic articles exhibit a* values ranging from about −2 to about 1, or from about −0.5 to about −0.2, and b* values ranging from about −5 to about −2, or from about −2.5 to about −1.

As noted, glass-ceramics according to aspects and/or embodiments of this disclosure exhibiting or having "β-spodumene solid solution as the predominant crystalline phase" (alternatively stated "β-spodumene ss as the predominant crystalline phase" or "β-spodumene as the predominant crystalline phase") means that β-spodumene solid solution (alternatively stated "β-spodumene ss" or "β-spodumene") constitutes greater than about 70 percent by weight (wt %) of all the crystalline phases of a glass-ceramic according to aspects and/or embodiments of this disclosure. Non limiting examples of other possible crystalline phases of glass-ceramics according to aspects and/or embodiments of this disclosure include: β-quartz solid solutions ("β-quartz ss" or "β-quartz"); β-eucryptite solid solutions ("β-eucryptite ss" or "β-eucryptite"); spinel solid solutions ("spinel ss" or "spinel" {such as e.g., gahnite . . . etc.}); Ti containing crystalline phases (such as e.g., rutile, anatase, magnesium titanates {such as e.g., karrooite ($MgTi_2O_5$) . . . etc.}, aluminum titanates {such as e.g., tielite ($Al_2TiO_5$) . . . etc.}, . . . etc.); cordierite (such as e.g., {Mg, Fe}$_2$Al$_3${Si$_5$AlO$_{18}$} to {Fe,Mg}$_2$Al$_3${Si$_5$AlO$_{18}$}), and the like.

A predominance of β-spodumene solid solution in β-spodumene glass-ceramics according to aspects and/or embodiments of this disclosure can be beneficial when such glass-ceramics are subjected to one or more IX treatments to produce IX glass-ceramics. For example, the structure of β-spodumene can exhibit flexibility without a breakdown of the framework when Li ions are exchanged for a variety of cations (e.g., ions of Na, K, Rb . . . etc.).

According to some aspects and/or embodiments of this disclosure, β-spodumene glass-ceramics can be characterized as being opaque and/or being white. In such cases, Applicants have found that to achieve desired opacity and/or desired whiteness levels such β-spodumene glass-ceramics include one or more Ti-containing crystalline phases, which include rutile, as a minor crystalline phase. Example of such one or more Ti-containing crystalline phases include any of rutile ($TiO_2$) and, optionally, can include one or more of anatase ($TiO_2$), karrooite ($MgTi_2O_5$), tielite ($Al_2TiO_5$) . . . etc., and mixtures thereof. When it is desirable to achieve a desired opacity and desired whiteness levels, Applicants have found that to achieve a desired degree of opacity and whiteness such β-spodumene glass-ceramics include one or more Ti-containing crystalline phases, which include rutile, can be acicular crystals exhibiting in some aspects a length ≥50 nm, in other aspects a length ≥110 nm, and in still other aspects a length ≥1 μm, while in some instances up to 2 μm.

Spinels are crystalline oxides having the generic formula $AB_2O_4$ and the basic spinel structure that is cubic. The prototype spinel structure is that of magnesium aluminate ($MgAl_2O_4$). In the basic spinel structure, O-atoms fill the sites of a face centered cubic (FCC) array; A-atoms occupy some of tetrahedral sites (A-sites) in the FCC structure; and B-atoms occupy octahedral sites (B-sites) in the FCC structure. In the normal spinels, the A and B atoms are different, A is a +2 ion and B is a +3 ion. In disordered spinels the +2 ions and +3 ions are randomly distributed over the A-sites and B-sites. In inverse spinels the A-sites are occupied by +3 ions with the consequence that the B-sites have an equal mixture of +2 ions and +3 ions and the A and B atoms can be the same. In some instances some A-sites can be occupied by +2 ions, +3 ions, and/or +4 ions while in the same or other instances B-sites can be occupied by +2 ions, +3 ions, and/or +4 ions. Some examples of A-atoms include zinc, nickel, manganese, magnesium, iron, copper, cobalt . . . etc. Also some examples of B-atoms include aluminum, antimony, chromium, iron, manganese, titanium, vanadium . . . etc. A wide range of solid solutions are common in spinels and can be represented by the generic formula $(A_x^1 A_{1-x}^2)[B_y^1 B_{2-y}^2]O_4$. For example, complete solid solution is obtained between $ZnAl_2O_4$ and $MgAl_2O_4$, which can represented by the formula $(Zn_x^1 Mg_{1-x}^2)Al_2O_4$. According to some aspects and/or embodiments of this disclosure, β-spodumene glass-ceramics include one or more crystalline phases exhibiting a spinel structure, which in aspects have compositions close to that of gahnite, $ZnAl_2O_4$. Also it has been found that as the amounts of ZnO or ZnO and $Al_2O_3$ are increased, such β-spodumene glass-ceramics can have increased amounts of gahnite. The refractive index (n) of gahnite can range between 1.79-1.82, which can be higher than that of β-spodumene (n=between 1.53-1.57) but significantly less than that of rutile (n=between 2.61-2.89). Also, in contrast to β-spodumene and rutile that are tetragonal, being cubic spinels can exhibit no birefringence. Therefore, Applicants believe that spinels in general and Zn-containing spinels in particular would have less of an influence on color of β-spodumene glass-ceramics than would rutile.

In aspects of embodiments of this disclosure when β-spodumene glass-ceramics include Ti-containing crystalline phases comprising rutile, it can range between 2.5 wt % to 6 wt % of the crystalline phases. Applicants have found that by maintaining rutile as at least 2.5 wt % of the crystalline phases minimum desired opacity levels can be ensured while by maintaining rutile as 6 wt % or less of the crystalline phases desired opacity levels can be maintained while at the same time desired white levels can be ensured. Stated differently, the $TiO_2$ content of β-spodumene glass-ceramics can range between 2-5 mole % and by maintaining at least 2 mole % minimum desired opacity levels can be ensured while by maintaining 5 mole % or less desired opacity levels can be maintained while at the same time desired white levels can be ensured.

For comparison, the refraction index (n) in descending order for several materials follows: rutile (n=between 2.61-2.89); anatase (n=between 2.48-2.56); diamond (n=between 2.41-2.43); gahnite (n=between 1.79-1.82); sapphire (n=between 1.75-1.78); cordierite (n=between 1.52-1.58); β-spodumene (n=between 1.53-1.57); and residual glass (n=between 1.45-1.49). Also for comparison, the birefringence (Δn) in descending order for the some of the same materials follows: rutile (Δn=between 0.25-0.29); anatase (Δn=0.073); sapphire (Δn=0.008); cordierite (Δn=between 0.005-0.017); diamond (Δn=0); and gahnite (Δn=0). Based on the above data, it can be seen that some of the Ti-containing crystalline phases, and rutile in particular, are among the materials exhibiting some of the highest refractive indices. In addition, it can be seen that the some of the Ti-containing crystalline phases, and rutile in particular, exhibit relatively high birefringence (Δn), a result of the anisotropic character of their tetragonal crystal structure. As a difference in either refractive index or birefringence increases among a predominant crystalline phase (e.g., β-spodumene {n=between 1.53-1.57}) and/or any residual glass (n=between 1.45-1.49) and any minor crystalline phases of glass-ceramics scattering of visible wavelengths can increase in turn increasing opacity. A difference in each characteristic alone can be beneficial while a difference in both may be even more so. Given the differences in both among some of the Ti-containing crystalline phases, and rutile in particular, and the base phase(s) (β-spodumene and any residual glass), the β-spodumene glass-ceramics of the present disclosure exhibit desirable level scattering that can be relatively high and, thus the requisite and desired opacity that likewise can be high.

$Al_2O_3$ contributes to the β-spodumene glass-ceramics of the present disclosure exhibiting β-spodumene as the predominant crystalline phase. As such, a minimum of about 10 mole % $Al_2O_3$ is desired. Above about 18 mole % $Al_2O_3$ is undesirable as the resultant mullite liquidus makes it difficult to melt and form crystallizable glasses.

Including $Na_2O$ and $K_2O$ can reduce the melting temperature of the crystallizable glasses and/or enable shorter crystallization cycles.

Crystallizable glasses and/or β-spodumene glass-ceramics of the present disclosure contain 6-20 mole % $B_2O_3$. Crystallizable glasses of present disclosure typically can be melted at a temperature below 1600° C., in certain aspect and/or embodiments below about 1580° C. while in certain other aspect and/or embodiments below about 1550° C., making it possible to melt in a relatively small commercial glass tank. The inclusion of $B_2O_3$ is conducive to the low melting temperature. Further, the addition of $B_2O_3$ can improve the damage resistance of the glass-ceramics. As discussed above, the addition of $B_2O_3$ is believed to increase the damage resistance because the boron in the residual glass is not charge balanced by alkali oxides or divalent cation oxides. As a result, the boron will be predominantly in a three-fold coordination state (boron cations surrounded by three anions) rather than a four-fold coordination state (boron cations surrounded by four anions). The connectivity of three-fold coordinated boron is less than that of four-fold coordinated boron state so that three-fold coordinated boron can be more readily deformed when compressed, thus providing greater intrinsic or native damage resistance as measured by the Vickers crack initiation threshold.

MgO and ZnO can act as fluxes for crystallizable glasses. As such, a minimum mole % sum [MgO+ZnO] of 2 mole % is desired to obtain a glass melting temperature below 1600° C. Ions of Mg and, to a lesser extent, ions of Zn can participate in the β-spodumene of the β-spodumene glass-ceramics or can react with $Al_2O_3$ to form a spinel crystalline phase.

Maintaining $Li_2O$ between 5-14 mole % in crystallizable glasses encourages the formation of β-spodumene solid solution crystalline phases. Also, $Li_2O$ acts as a flux to decrease the melting point of the crystallizable glasses. As such, a minimum of 5 mole % $Li_2O$ is desired in order to obtain the desired β-spodumene phase. Above 14 mole % $Li_2O$ can be undesirable as unwelcome phases, such as, lithium silicates . . . etc., might result during the formation of glass-ceramics.

An appropriate type and amount of one or more nucleation agents is included in crystallizable glasses to facilitate nucleation and/or growth of at least β-spodumene as the predominant crystalline phase and any desired one or more minor crystalline phases during the nucleation and/or crystallization heat treatments. Among appropriate types of one or more nucleation agents are $TiO_2$, $ZrO_2$ . . . etc. while among appropriate amounts are $TiO_2$: up to 6 mole %; and/or $ZrO_2$: up to 2 mole % . . . etc. Small amounts of $SnO_2$ appear to enter the rutile phase in solid solution and, as such, might contribute to nucleation. In aspects and/or embodiments, applicants have found that an inclusion of $TiO_2$ as a nucleation agent is desirable when the formation of one or more Ti-containing phases is desired to achieve a prescribed degree of opacity and whiteness levels. In other aspects and/or embodiments, an inclusion of $ZrO_2$ as a nucleation agent can increase nucleation efficiency. Thus, types and amount of one or more nucleation agents is carefully prescribed. It is noted that in certain aspect and/or embodiments relating to β-spodumene glass-ceramics (optionally exhibiting β-quartz solid solution), a minimum mole % sum $[TiO_2+SnO_2]$ in excess of 2.5 mole % is desired as an ingredient of crystallizable glasses. In other words, effective amounts of this mole % sum $[TiO_2+SnO_2]$ are formulated as an ingredient of crystallizable glasses so that nucleation in an effective manner occurs and growth is achieved to a preselected and appropriate crystal phase assemblage. It is noted that above 6 mole % $TiO_2$ is undesirable as the resultant high rutile liquidus has the potential of increasing difficulties during shape forming of crystallizable glasses. Also, it is noted that an inclusion of $SnO_2$, in addition to its possible minor contribution to nucleation, can partially function as a fining agent during a manufacture of crystallizable glasses to contribute to their quality and integrity.

Maintaining the ratio:

$$\frac{[TiO_2 + SnO_2]}{[SiO_2 + B_2O_3]}$$

in some aspects greater than 0.04 and, in some alternative aspects, greater than 0.05 can contribute to achieving preselected and appropriate crystal phase assemblages that, in turn, contributes to achieving prescribed degrees of opacity and/or whiteness levels.

Also in β-spodumene glass-ceramics and/or their crystallizable glasses according to aspect and/or embodiments, applicant have found that β-spodumene crystalline phases exhibiting a $Li_2O:Al_2O_3:SiO_2$ ratio between 1:1:4.5-1:1:8 to be desirable. As such, a minimum ratio of 1:1:4.5 is desired to avoid the formation of excessive levels of the unstable residual glass in the resultant β-spodumene glass-ceramics. Above a ratio of 1:1:8 is undesirable as issues with meltability of crystallizable glasses can arise. In some embodiments, MgO can be substituted for $Li_2O$ such that moles of MgO divided by the mole sum of $[MgO+Li_2O]$ can be up to about 30%.

Other properties that can be exhibited by β-spodumene glass-ceramics according to aspects and/or embodiments of this disclosure include one or more of:

(1) radio and microwave frequency transparency, as defined by a loss tangent of less than 0.03 and at a frequency range of between 15 MHz to 3.0 GHz;
(2) a fracture toughness greater than 0.8 $MPa \cdot m^{1/2}$;
(3) a Modulus of Rupture (MOR) greater than 20,000 psi;
(4) a Knoop hardness of at least 400 $kg/mm^2$;
(5) a thermal conductivity of less than 4 W/m° C.; and
(6) a porosity of less than 0.1 vol %.

In aspects and/or embodiments relating to articles in general and electronic device housings or enclosures in particular (each partially or completely comprised of β-spodumene glass-ceramics), such articles and/or β-spodumene glass-ceramics exhibit radio and microwave frequency transparency, as defined in some aspects by a loss tangent of less than 0.02; in alternative aspects of less than 0.01; and in still further aspects of less 0.005, the loss tangent determined over a frequency ranging from 15 MHz to 3.0 GHz at about 25° C. This radio and microwave frequency transparency feature can be especially beneficial for wireless hand held devices that include antennas internal to the enclosure. This radio and microwave transparency allows the wireless signals to pass through the housings or enclosures and in some cases enhances these transmissions. Additional benefits can be realized when such articles and/or β-spodumene glass-ceramics exhibit a dielectric constant determined over a frequency ranging from 15 MHz to 3.0 GHz at about 25° C. of less than about 10; alternatively, less than about 8; or then again, less than about 7 in combination with the above values of loss tangent.

In still further aspects and/or embodiments of this disclosure relating to β-spodumene glass-ceramics that have been chemically strengthened, such IX, β-spodumene glass-ceramics exhibit a fracture toughness of greater than 0.8 $MPa \cdot m^{1/2}$; alternatively, greater than 0.85 $MPa \cdot m^{1/2}$; or then again, greater than 1 $MPa \cdot m^{1/2}$. Independent of or in combination with the stated fracture toughnesses, such IX, β-spodumene glass-ceramics exhibit a MOR of greater than 40,000 psi or, alternatively, greater than greater than 50,000 psi.

Other aspects and/or embodiments of this disclosure relate to methods for forming crystallizable glasses formulated to be crystallizable to glass-ceramics and methods for forming glass-ceramics having a β-spodumene as the predominant crystalline phase. In aspects, some methods included melting a mixture of raw materials formulated to produce upon melting crystallizable glasses, in mole %, including: $SiO_2$ in a range from about 60 to about 75; $Al_2O_3$ in a range from about 10 to about 18; $Li_2O$ in a range from about 5 to about 14; $B_2O_3$ in a range from about 6 to about 20; while in alternative aspects, in mole %, include: $SiO_2$ in a range from about 60 to about 75; $Al_2O_3$ in a range from about 10 to about 18; $Li_2O$ in a range from about 5 to about 14; $B_2O_3$ in a range from about 6 to about 20; MgO in a range from 0 to about 8; ZnO in a range from 0 to about 4; $TiO_2$ in a range from about 2 to about 5; $Na_2O$ in a range from 0 to about 5; $K_2O$ in a range from 0 to about 4; and $SnO_2$ in a range from about 0.05 to about 0.5.

In additional aspects, such mixture of raw materials is formulated to produce upon melting crystallizable glasses exhibiting the following compositional criteria:

the ratio of $$\frac{\text{the mole sum total of } [Li_2O + Na_2O + K_2O + MgO + ZnO]}{\text{moles of } [Al_2O_3]} \text{ can be in a range from about 0.8 to about 1.5.}$$

In still other aspects, such mixture of raw materials is formulated to produce the above crystallizable glasses upon fining and homogenization molten glass compositions at a temperature below about 1600° C. Still yet other aspects included forming molten crystallizable glasses into a glass article.

In further aspects, some other methods include methods for forming glass-ceramics having a β-spodumene as the predominant crystalline phase by transforming crystallizable glasses. Such other methods including (i) heating a glass article comprising and/or a crystallizable glass formulated to be crystallizable to a glass-ceramic having a β-spodumene as the predominant crystalline phase at a rate in a range from about 1° C./min to about 10° C./min to a nucleation temperature (Tn) in a range from about 700° C. to about 810° C.; (ii) maintaining the glass article comprising and/or the crystallizable glass at the nucleation temperature for a time, for example in a range between ¼ h to 2 h, to produce a glass article comprising and/or a nucleated crystallizable glass; (iii) heating the glass article comprising and/or a nucleated crystallizable glass at a rate in a range from about 1° C./min to about 10° C./min to a crystallization temperature (Tc) in a range from about 850° C. to about 1200° C.; (iv) maintaining the glass article comprising and/or the nucleated crystallizable glass at the crystallization temperature for a time, for example in a range between about ¼ h to 4 h, to produce an article comprising and/or a glass-ceramic having a β-spodumene as the predominant crystalline phase; and (v) cooling the article comprising and/or a glass-ceramic having β-spodumene as the predominant crystalline phase to room temperature. In some embodiments, the cooling can include quenching the article comprising and/or a glass-ceramic having β-spodumene as the predominant crystalline phase once it is at a temperature in a range from about 800° C. to about 1100° C. In some embodiments, the quenching process can cool at a rate between about 300 to about 500° C./min. The quenching can continue until the article comprising and/or a glass-ceramic having β-spodumene as the predominant crystalline phase reaches room temperature.

Regarding raw material selection it is recommended that low iron content sand is used as the $SiO_2$ source. Prior acid treatment may be necessary to reduce the iron level of the sand and other batch materials. It is important to make sure that the treatment of the batch materials per se does not introduce iron oxides. Anhydrous boric acid may be used as the source of $B_2O_3$. Spodumene, fine alumina, and Al-metaphosphate may be used as the starting materials. One skilled in the art can calculate the amount of batch materials used according to the projected final composition of the glass-ceramic. As mentioned above, a fining agent that has been found to be beneficial is $SnO_2$ in an amount between about 0.05-0.15 mole %.

The mixed batch materials are then charged into a glass tank and melted according to conventional glass melting process. One skilled in the glass melting art can adjust the composition of the batch within the above described compositional range to fine tune the melting ease of the glass in order to accommodate the operating capacity and temperature of the glass melting tank. The molten glass can be homogenized and fined using conventional methods. Whilst some glasses having a melting temperature over 1600° C. can crystallize to form β-quartz and/or β-spodumene solid solution glass-ceramic, such high temperature melting usually has to be carried out in expensive melting tanks with special design. In addition, the liquidus behavior of such high melting temperature glass usually requires higher temperature pressing and molding.

The homogenized, fined and thermally uniform molten glass is then formed into desired shapes. Various shaping may be used, such as casting, molding, pressing, rolling, floating, and the like. Generally, the glass should be delivered at a viscosity lower than the liquidus viscosity (hence a temperature higher than the liquidus temperature). Take pressing for example. The glass is first delivered to high temperature molds and formed into glass articles with desired shape, surface texture and surface roughness by using a plunger. To obtain low surface roughness and a precise surface contour, precision plungers are required to press the glass gobs filled in the molds. It is also required that the plungers will not introduce IR absorbing oxides or other defects onto the surface of the glass article should high IR transmission is required. The moldings are then removed from the molds and transferred to a glass annealer to remove enough stress in the moldings for further processing where necessary and desirable. Thereafter, the cooled glass moldings are inspected, analyzed of chemical and physical properties for quality control purpose. Surface roughness and contour may be tested for compliance with product specification.

To produce the glass-ceramic article of the present disclosure, the thus prepared glass articles are placed into a crystallization kiln to undergo the crystallization process. The temperature-temporal profile of the kiln is desirably program-controlled and optimized to ensure that the glass moldings and other glass articles, such as glass plates and the like, are formed into glass-ceramic articles having β-spodumene as the predominant crystalline phase. As described above, the glass composition and the thermal history during the crystallization process determine the final crystalline phases, their assemblage and crystallite sizes in the final product. Generally, the glass articles are first heated to a nucleation temperature (Tn) range where crystal nuclei start to form. Subsequently, they are heated to an even higher maximum crystallization temperature Tc to obtain β-spodumene crystallization. It is often desired to keep the articles at Tc for a period of time so that crystallization reaches a desired extent. In order to obtain the glass-ceramic articles of the present disclosure, the nucleation temperature Tn is between 700-810° C., and the maximum crystallization temperature Tc is between 850° C.-1250° C. After crystallization, the articles are allowed to exit the crystallization kiln and are cooled to room temperature. One skilled in the art can adjust Tn, Tc and the temperature-temporal profile of the crystallization cycle to accommodate the different glass compositions within the above-described range. The glass-ceramic article of the present disclosure can advantageously exhibit an opaque white coloring.

The glass-ceramic article of the present disclosure may be further processed before its final intended use. One such post-processing includes IX treatment of the glass-ceramic to form an IX glass-ceramic article having at least a portion of at least one surface subjected to an IX process, such that the IX portion of the least one surface exhibits a compressive layer having a depth of layer (DOL) greater than or equal to 2% of the overall article thickness while exhibiting a compressive stress ($\sigma_s$) in the surface of at least 80 MPa or at least 300 MPa. Any IX process known to those in the art might be suitable as long as the above DOL and compressive stress ($\sigma_s$) are achievable.

In a more particular embodiment the housing or enclosure exhibits an overall thickness of 2 mm and compressive layer exhibiting a DOL of 40 nm with that compressive layer exhibiting a compressive stress ($\sigma_s$) of at least 150 MPa. Again any IX process which achieves these features is suitable.

It is noted that in addition to single step IX processes, multiple IX procedures might be utilized to create a designed IX profile for enhanced performance. That is, a stress profile created to a selected depth by using IX baths formulated with differing concentration of ions or by using multiple IX baths formulated using different ion species having different ionic radii.

As used herein, the term "ion exchanged" is understood to mean treating the heated β-spodumene glass-ceramic or crystallizable glass composition with a heated solution containing ions having a different ionic radius than ions that are present in the glass-ceramic surface, crystallizable glass, and/or bulk, thus replacing those ions with smaller ions with the larger ions or vice versa depending on the ion exchange ("IX") temperature conditions. Potassium (K) ions, for example, could either replace, or be replaced by, sodium (Na) ions in the glass-ceramic, again depending upon the IX temperature conditions. Alternatively, other alkali metal ions having larger atomic radii, such as (Rb) rubidium or cesium (Cs) could replace smaller alkali metal ions in the glass-ceramic or crystallizable glass. Similarly, other alkali metal salts such as, but not limited to, sulfates, halides, and the like may be used in the ion exchange ("IX") process.

In the instant method, it is contemplated that both types of IX can take place; i.e., larger for smaller ions are replaced and/or smaller for larger ions are replaced. In one some aspects and/or embodiments, the method involves IX (particularly lithium-for-sodium ion exchange) the β-spodumene glass-ceramic or crystallizable glass by placing it in an $NaNO_3$ bath at temperatures between 310-490° C. for times up to 20 h. In some embodiments, the ion-exchange under the above conditions can achieve a DOL of at least 80 microns. In other aspects and/or embodiments, the IX can be accomplished utilizing mixed potassium/sodium baths at similar temperatures and times; e.g., an 80/20 $KNO_3/NaNO_3$ bath or alternatively a 60/40 $KNO_3/NaNO_3$ at comparable temperatures. In still other aspects and/or embodiments, a two-step IX process is contemplated wherein the first step is accomplished in a Li-containing salt bath; e.g. the molten salt bath can be a high temperature sulfate salt bath composed of $Li_2SO_4$ as a major ingredient, but diluted with $Na_2SO_4$, $K_2SO_4$ or $Cs_2SO_4$ in sufficient concentration to create a molten bath. This IX step functions to replace the larger sodium ions in the β-spodumene glass-ceramic with the smaller lithium ions which are found in the Li-containing salt bath. The second IX step functions to exchange Na into the β-spodumene glass-ceramic and can be accomplished as above by a $NaNO_3$ bath at temperatures between 310° C. and 490° C.

Characterization of Crystallizable Glasses, Glass-Ceramics, IXable Glass-Ceramics, and/or IX Glass-Ceramics CIELAB color space coordinates (e.g., CIE L*; CIE a*; and CIE b*; or CIE L*, a*, and b*; or L*, a*, and b*) for describing the color of β-spodumene glass-ceramics; IXable, β-spodumene glass-ceramic; and/or IX, β-spodumene glass-ceramics according to aspects and/or embodiments of this disclosure were determined by methods known to those in the art from total reflectance—specular included—measurements, such as, those described by F. W. Billmeyer, Jr., "Current American Practice in Color Measurement," Applied Optics, Vol. 8, No. 4, pp. 737-750 (April 1969), which are incorporated by reference herein. Namely, total reflectance—specular included—measurements were made of surfaces prepared to an optical polish using sample disks measuring about 33 mmφ×0.8 mm thick. Equipment and supplies for making such total reflectance—specular included—measurements and translating results to obtain L*; a*; and b* color space coordinates included:

an ultraviolet-visible-near infrared (UV-VIS-NIR) spectrophotometer equipped with integrating sphere such as the commercially available Varian Cary 5G or PerkinElmer Lambda 950 UV-VIS-NIR spectrophotometers appropriately equipped and configured so as to be enabled for total reflectance—specular included—measurements in the wavelength range 250-3300 nm (e.g., ultraviolet (UV: 300-400 nm), visible (Vis: 400-700 nm), and infrared (IR: 700-2500 nm); and an analytical software (UV/VIS/NIR application pack of the GRAMS spectroscopy software suite commercially available from Thermo Scientific West Palm Beach, Fla., US) for color measurements coupled to a UV-VIS-NIR spectrophotometer that translated measurement results to the CIELAB color space coordinates (L*; a*; and b*) based on F02 illuminant and a 10-degree standard observer.

Identity of the crystalline phases of crystal phase assemblages and/or crystal sizes of a crystalline phase for crystallizable glasses, glass-ceramics, IXable glass-ceramics, and/or IX glass-ceramics according to aspects and/or embodiments of this disclosure were determined by X-ray diffraction (XRD) analysis techniques known to those in the art, using such commercially available equipment as the model as a PW1830 (Cu Kα radiation) diffractometer manufactured by Philips, Netherlands. Spectra were typically acquired for 2θ from 5 to 80 degrees.

Elemental profiles measured for characterizing surfaces of crystallizable glasses, glass-ceramics, IXable glass-ceramics, and/or IX glass-ceramics according to aspects and/or embodiments of this disclosure were determined by analytical techniques know to those in the art, such as, electron microprobe (EMP); x-ray photoelectron spectroscopy (XPS); secondary ion mass spectroscopy (SIMS) . . . etc.

Compressive stress ($\sigma_s$) in a surface layer can be determined by methods described in Sglavo, V. M. et al., "Procedure for residual stress profile determination by curvature measurements," Mechanics of Materials 37:887-898 (2005), which is incorporated by reference herein in its entirety.

Flexural Strength of crystallizable glasses, glass-ceramics, IXable glass-ceramics, and/or IX glass-ceramics according to aspects and/or embodiments of this disclosure can be characterized by methods known to those in the art, such as, those described in ASTM C1499 (and its progeny, all herein incorporated by reference) "Determination of Monotonic Equibiaxial Flexural Strength Advanced Ceramics," ASTM International, Conshohocken, Pa., US.

Young's Modulus, Shear Modulus, and Poisson's Ratio of crystallizable glasses, glass-ceramics, IXable glass-ceramics, and/or IX glass-ceramics according to aspects and/or embodiments of this disclosure can be characterized by methods known to those in the art, such as, those described in ASTM C1259 (and its progeny, all herein incorporated by reference) "Standard Test Method for Dynamic Young's Modulus, Shear Modulus, and Poisson's Ratio for Advanced Ceramics by Impulse Excitation of Vibration," ASTM International, Conshohocken, Pa., US.

Knoop hardness of crystallizable glasses, glass-ceramics, IXable glass-ceramics, and/or IX glass-ceramics according to aspects and/or embodiments of this disclosure can be characterized by methods known to those in the art, such as, those described in ASTM C1326 (and its progeny, all herein incorporated by reference) "Standard Test Methods for Vickers Indentation Hardness of Advanced Ceramics," ASTM International, Conshohocken, Pa., US.

Vickers hardness of crystallizable glasses, glass-ceramics, IXable glass-ceramics, and/or IX glass-ceramics according to aspects and/or embodiments of this disclosure can be characterized by methods known to those in the art, such as, those described in ASTM C1327 (and its progeny, all herein incorporated by reference) Standard Test Methods for Vickers Indentation Hardness of Advanced Ceramics," ASTM International, Conshohocken, Pa., US.

Vickers indentation cracking threshold measurements of crystallizable glasses, glass-ceramics, IXable glass-ceramics and/or IX glass-ceramics according aspects and/or embodiments of this disclosure can be characterized by methods known to those in the art, such as by applying and then removing an indentation load to a Vickers indenter as described in ASTM C1327 to the surface of the material to be tested at a rate of 0.2 mm/min. The maximum indentation load is held for 10 seconds. The indentation cracking threshold is defined at the indentation load at which 50% of 10 indents exhibit any number of radial/median cracks emanating from the corners of the indent impression. The maximum load is increased until the threshold is met for a given glass or glass-ceramic composition. All indentation measurements are performed at room temperature in 50% relative humidity.

Coefficient of thermal expansion (CTE) of crystallizable glasses, glass-ceramics, IXable glass-ceramics, and/or IX glass-ceramics according to aspects and/or embodiments of this disclosure can be characterized by methods known to those in the art, such as, those described in ASTM E228 (and its progeny, all herein incorporated by reference) Standard Test Method for Linear Thermal Expansion of Solid Materials with a Push-Rod Dilatometer," ASTM International, Conshohocken, Pa., US.

Fracture toughness ($K_{1C}$) of crystallizable glasses, glass-ceramics, IXable glass-ceramics, and/or IX glass-ceramics according to aspects and/or embodiments of this disclosure can be characterized by methods known to those in the art, such as, those described in ASTM C1421 (and its progeny, all herein incorporated by reference) Standard Test Methods for Determination of Fracture Toughness of Advanced Ceramics at Ambient Temperature," ASTM International, Conshohocken, Pa., US and/or using chevron notched short bar (CNSB) specimens and/or methods substantially according to ASTM E1304 C1421 (and its progeny, all herein incorporated by reference) "Standard Test Method for Plane-Strain (Chevron-Notch) Fracture Toughness of Metallic Materials," ASTM International, Conshohocken, Pa., US.

EXAMPLES

The following examples illustrate the advantages and features of this disclosure and in are no way intended to limit this disclosure thereto.

Inasmuch as the sum of the individual constituents totals or very closely approximates 100, for all practical purposes the reported values may be deemed to represent mole %. The actual crystallizable glass batch ingredients may comprise any materials, either oxides, or other compounds, which, when melted together with the other batch components, will be converted into the desired oxide in the proper proportions.

TABLE I

| Oxide [mole %] | Composition | | | |
|---|---|---|---|---|
| | 1 | 2 | 3 | 4 |
| $SiO_2$ | 69.2 | 67.3 | 66.0 | 64.7 |
| $Al_2O_3$ | 12.59 | 13.5 | 13.2 | 13.0 |
| $B_2O_3$ | 1.84 | 2.0 | 3.9 | 5.8 |
| $Li_2O$ | 7.7 | 7.7 | 7.6 | 7.4 |
| $Na_2O$ | 0.41 | 0.6 | 0.6 | 0.6 |
| MgO | 2.85 | 4.0 | 3.9 | 3.8 |
| ZnO | 1.73 | 1.2 | 1.2 | 1.1 |
| $TiO_2$ | 3.52 | 3.5 | 3.5 | 3.4 |
| $SnO_2$ | 0.17 | 0.2 | 0.2 | 0.2 |
| $[Li_2O + Na_2O + MgO + ZnO + K_2O] / [Al_2O_3]$ | 1.01 | 1 | 1 | 1 |

| Oxide [mole %] | Composition | | | |
|---|---|---|---|---|
| | 5 | 6 | 7 | 8 |
| $SiO_2$ | 63.5 | 62.3 | 61.2 | 63.0 |
| $Al_2O_3$ | 12.7 | 12.5 | 12.3 | 15.5 |
| $B_2O_3$ | 7.6 | 9.3 | 10.9 | 2.3 |
| $Li_2O$ | 7.3 | 7.1 | 7.0 | 9.7 |
| $Na_2O$ | 0.6 | 0.6 | 0.6 | 0.6 |
| MgO | 3.8 | 3.7 | 3.6 | 4.0 |
| ZnO | 1.1 | 1.1 | 1.1 | 1.2 |
| $TiO_2$ | 3.3 | 3.3 | 3.2 | 3.5 |
| $SnO_2$ | 0.2 | 0.2 | 0.2 | 0.2 |
| $[Li_2O + Na_2O + MgO + ZnO + K_2O] / [Al_2O_3]$ | 1 | 1 | 1 | 1 |

| Oxide [mole %] | Composition | |
|---|---|---|
| | 9 | 10* |
| $SiO_2$ | 59.3 | 67.0 |
| $Al_2O_3$ | 15.5 | 13.5 |
| $B_2O_3$ | 6.0 | 2.3 |
| $Li_2O$ | 9.7 | 7.7 |
| $Na_2O$ | 0.6 | 0.6 |
| MgO | 4.0 | 4.0 |
| ZnO | 1.2 | 1.2 |
| $TiO_2$ | 3.5 | 3.5 |
| $SnO_2$ | 0.2 | 0.2 |
| $[Li_2O + Na_2O + MgO + ZnO + K_2O] / [Al_2O_3]$ | 1.0 | 1.0 |

The crystallizable glasses listed in Table I were used in the following examples. The amount of $B_2O_3$ varies among compositions 1-10 to illustrate the effects of $B_2O_3$ on various properties including the Vickers crack initiation threshold.

Example 1

Figure 2:
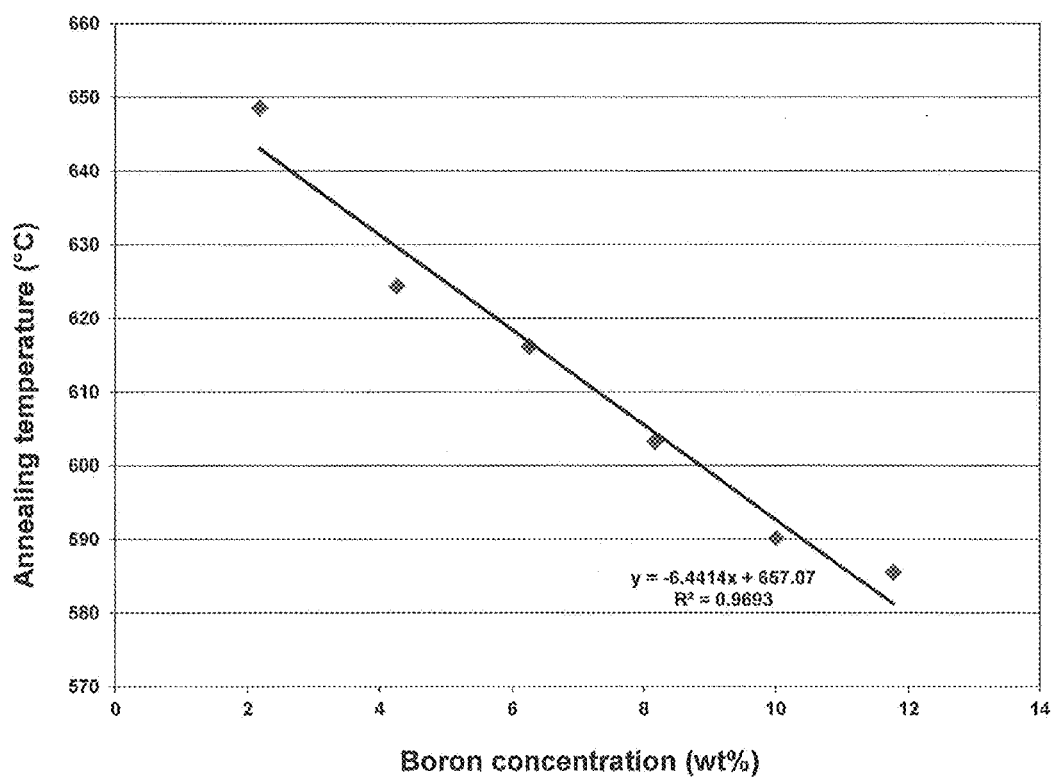
FIG. 2 shows a plot of the boron oxide concentration in weight % vs. the annealing temperature (° C.)

Crystallizable glass compositions 2-7 were formed by heating the compositions to a nucleation temperature of 780° C. and maintaining the compositions at the nucleation temperature for 2 hours. Then each of compositions 2-7 were heated to a crystallization temperature of 900 to 1000° C. at a rate of 5° C./min and held at the crystallization temperature for 4 hours and allowed to cool. The strain temperature for each of the glass-ceramics was determined by a beam bending viscometer (BBV). The strain point ($\eta=10^{14.5}$ Poise) refers to a temperature at which stresses relaxes within several hours. FIG. 1 shows a plot of the boron oxide concentration in weight % vs. the strain temperature (° C.). The plot shows that the strain temperature varies with boron oxide concentration according to the following relationship: strain temperature=−6.4557*($B_2O_3$ weight %)+611.49. The relationship has an $R^2$ fit value of 0.9661. The annealing temperature for each was determined by beam bending viscometer (BBV). The annealing point ($\eta=10^{13}$ Poise) refers to a temperature at which stresses relaxes within several minutes. FIG. 2 shows a plot of the boron oxide concentration in weight % vs. the annealing temperature (° C.). The plot shows that the annealing temperature varies with boron oxide concentration according to the following relationship: annealing temperature=−6.4414*($B_2O_3$ weight %)+657.07. The relationship has an $R^2$ fit value of 0.9693. The plots in FIGS. 1 and 2 indicate that as the boron oxide concentration increases, the strain temperature and annealing temperature decrease. The addition of boron oxide softens the glass, which makes it easy to form into 3-D shapes.

Example 2

Figure 3:
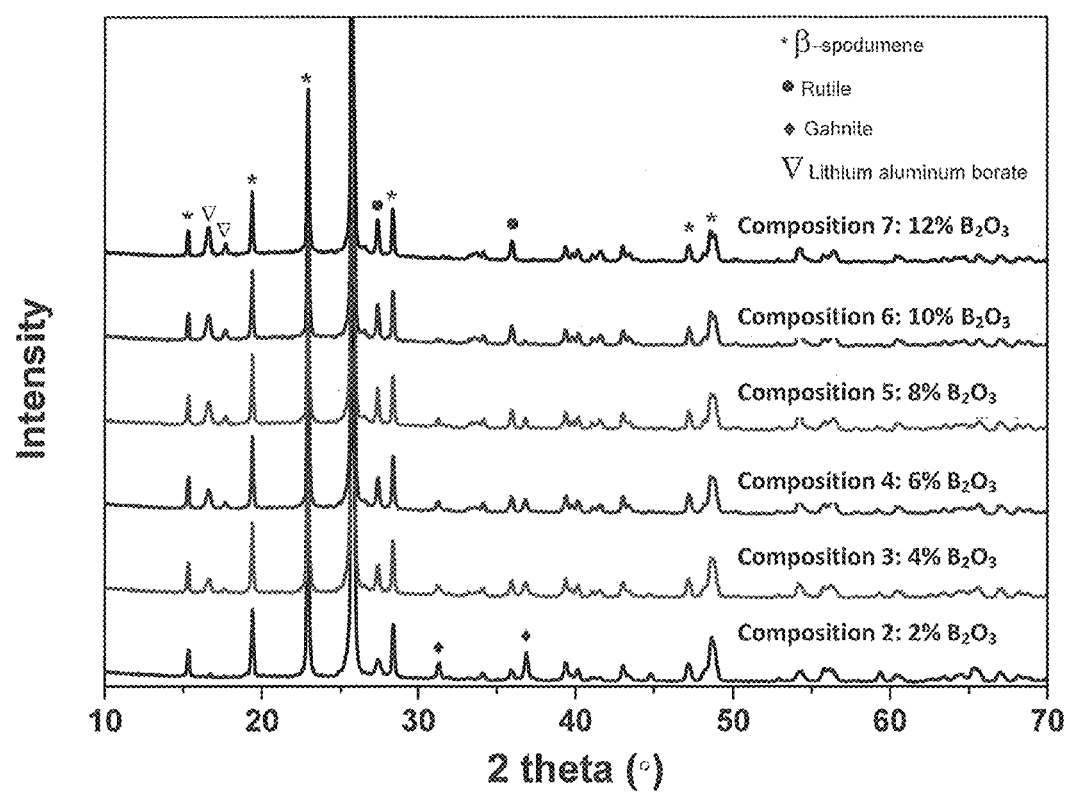
FIG. 3 shows a plot of scattering angle vs. intensity.

Compositions 2-7 were heated to a nucleation temperature of 780° C. and maintained at the nucleation temperature for 2 hours. Then each of compositions 2-7 were heated to a crystallization temperature of 900° C. at a rate of 5° C./min and held at the crystallization temperature for 4 hours and allowed to cool. The glass-ceramics were then subjected to X-ray diffraction spectroscopy to determine the crystallite phases present in the glass-ceramics. FIG. 3 shows a plot of scattering angle vs. intensity.

Example 3

Figure 4:
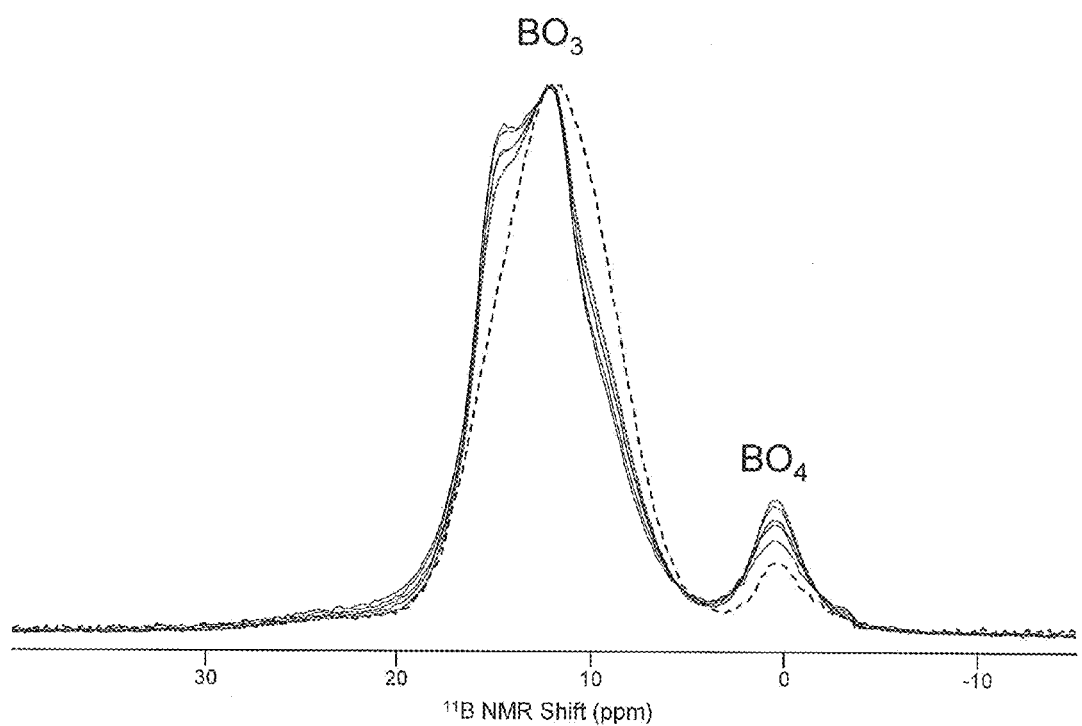
FIG. 4 shows the boron ($^{11}B$) nuclear magnetic resonance (NMR) spectra of exemplary glass-ceramics.
Figure 5:
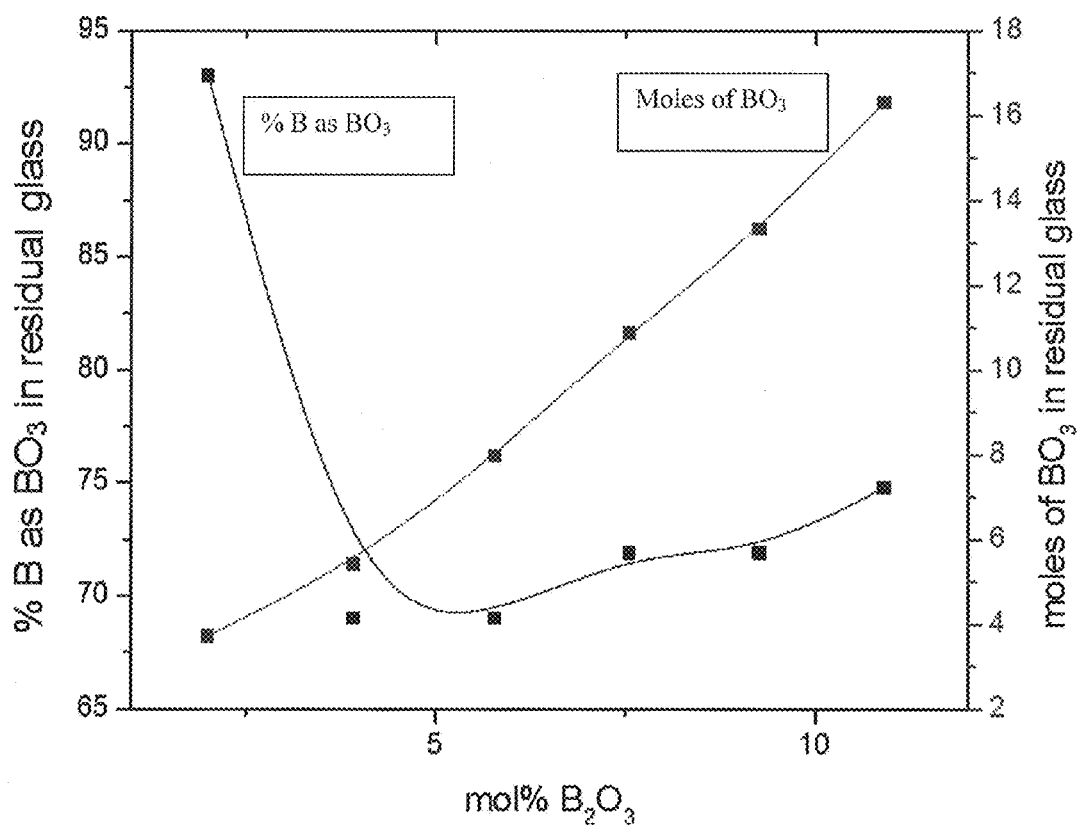
FIG. 5 shows the batched mole percentage of boron oxide vs. (1) the percent of boron present as $BO_3$ in the residual glass and (2) the moles of $BO_3$ in the residual glass.

Compositions 2-7 were heated to a nucleation temperature of 780° C. and maintained at the nucleation temperature for 2 hours. Then each of compositions 2-7 were heated to a crystallization temperature of 900° C. at a rate of 5° C./min and held at the crystallization temperature for 4 hours and allowed to cool. The glass-ceramics were subjected to nuclear magnetic resonance (NMR) spectroscopy. FIG. 4 shows the $^{11}B$ NMR spectra and indicates that the boron in the residual glass is predominantly present as $BO_3$ (boron in three-fold coordination state) rather than $BO_4$ (boron in four-fold coordination state). FIG. 5 shows the batched mole percentage of boron oxide vs. (1) the percent of boron present as $BO_3$ in the residual glass and (2) the moles of $BO_3$ in the residual glass. As can be seen in FIG. 5, the moles of $BO_3$ in the residual glass increases with the mole % of $B_2O_3$ batched. As discussed above, an increase in $BO_3$ (boron in three-fold coordination state) has been found to increase the Vickers crack initiation threshold.

Example 4

Figure 6:
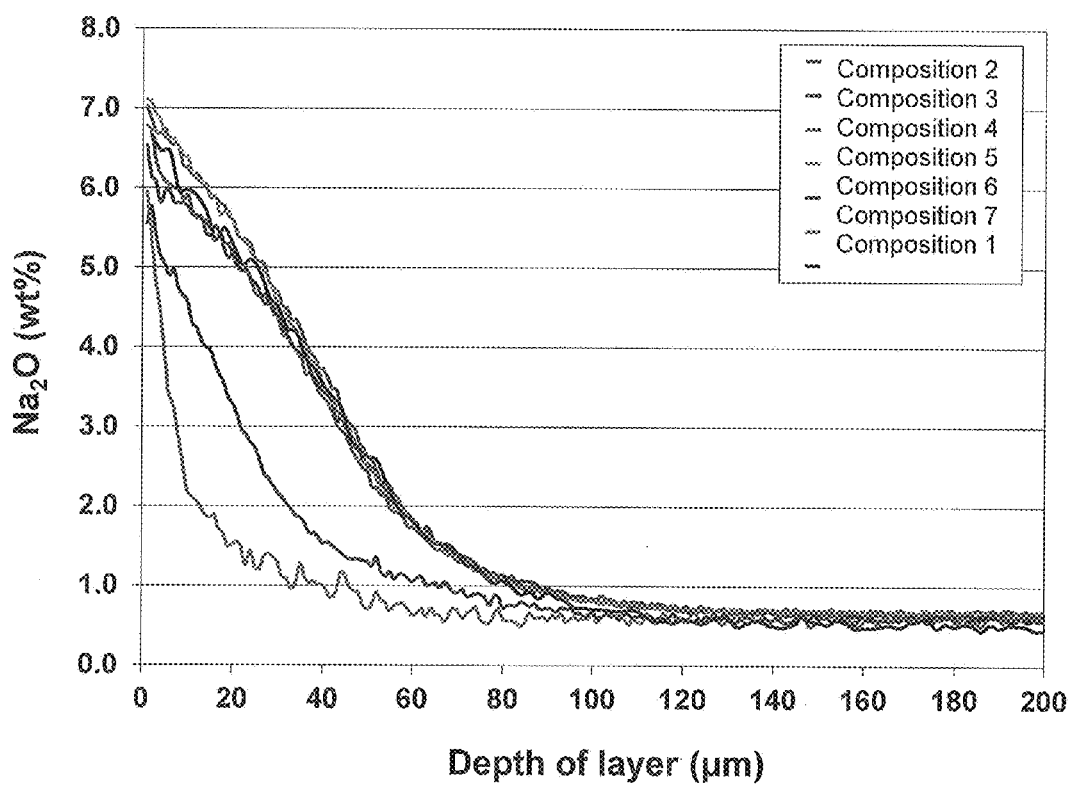
FIG. 6 shows a plot of the depth of the $Na_2O$ ion exchange layer in μm vs. the weight % of $Na_2O$.

Compositions 1-7 were heated to a nucleation temperature of 780° C. and maintained at the nucleation temperature for 2 hours. Then each of compositions 1-7 were heated to a crystallization temperature of 900° C. at a rate of 5° C./min and held at the crystallization temperature for 4 hours and allowed to cool. The glass-ceramics were then ion-exchanged in a molten salt bath containing $NaNO_3$ at 390° C. for 3.5 hours to form a compressive stress layer. FIG. 6 shows a plot of the depth of the compressive stress layer in µm vs. the weight % of $Na_2O$.

Example 5

Figure 7:
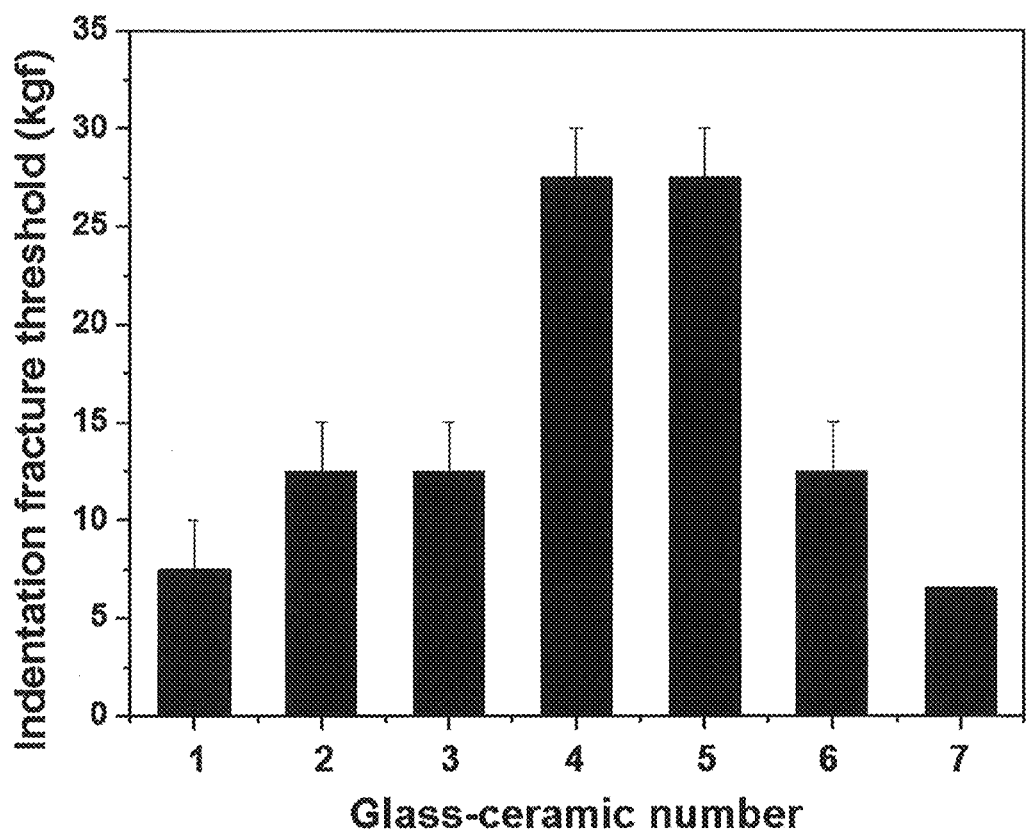
FIG. 7 shows the Vickers indentation fracture threshold in kgf of exemplary glass-ceramics.
Figure 8:
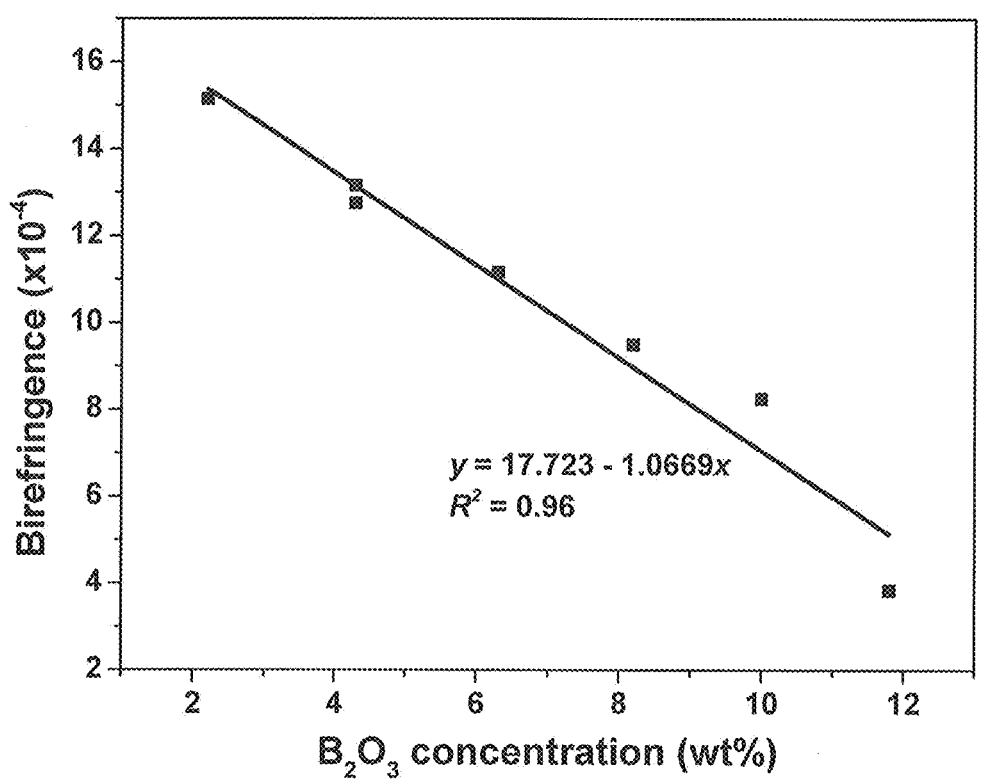
FIG. 8 shows a plot of $B_2O_3$ in weight % vs surface birefringence ($\times 10^4$) of exemplary glass-ceramics.

Compositions 2-7 were heated to a nucleation temperature of 780° C. and maintained at the nucleation temperature for 2 hours. Then each of compositions 2-7 were heated to a crystallization temperature of 900° C. at a rate of 5° C./min and held at the crystallization temperature for 4 hours and allowed to cool. Composition 1 was heated to a nucleation temperature of 780° C. and maintained at the nucleation temperature for 2 hours. Then composition 1 was heated to a crystallization temperature of 975° C. at a rate of 5° C./min and held at the crystallization temperature for 4 hours and allowed to cool. The glass-ceramics were then ion-exchanged in a molten salt bath containing $NaNO_3$ at 390° C. for 3.5 hours to form a compressive stress layer. FIG. 7 shows the Vickers indentation fracture threshold in kgf for each of compositions 1-7. As can be seen, thresholds values as high as 25 to 30 kgf were observed for glass-ceramic articles containing 6 to 8 mol % $B_2O_3$. The better crack resistance can be attributed to the densification mechanism due to the presence of a large number of boron in the three-fold coordination state as shown in FIGS. 4 and 5. The decrease in the threshold for glass-ceramics containing over 10 mol % $B_2O_3$ may possibly be attributed to their low Na concentration at the surface (see FIG. 6), formation of coarse grains, the presence of cracks near the surface after ion exchanging, and low surface compressive stress as measured by birefringence (see FIG. 8). FIG. 8 shows a plot of $B_2O_3$ in wt % v. surface birefringence ($\times 10^4$) of the glass-ceramics. As can be seen, the birefringence and $B_2O_3$ concentration have the following correlation: birefringence ($\times 10^4$)=17.723−1.0669*($B_2O_3$ concentration). The correlation has an $R^2$ fit value of 0.96. The decrease in birefringence value indicates a decreasing surface compressive stress as a function of boron oxide concentration.

Example 6

Figure 9:
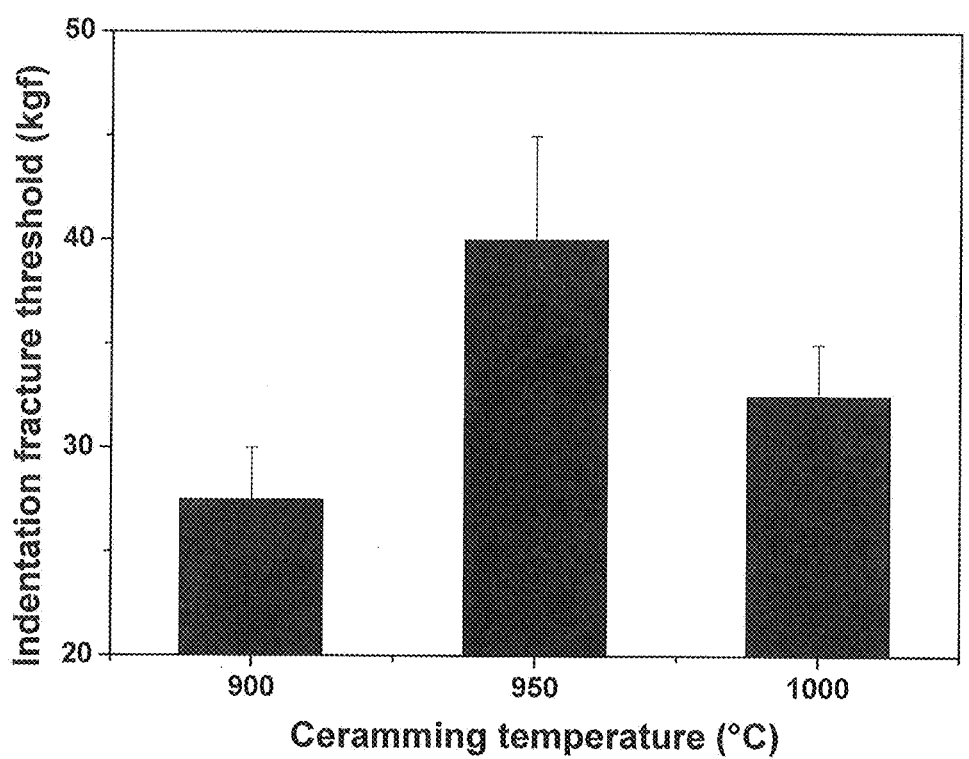
FIG. 9 shows the Vickers indentation fracture threshold in kgf for exemplary glass-ceramics.

Composition 4 was heated to a nucleation temperature of 780° C. and maintained at the nucleation temperature for 2 hours. Then composition 4 was heated to a crystallization temperature of 900° C., 950° C., and 1,000° C. at a rate of 5° C./min and held at the crystallization temperature for 4 hours for the crystallization temperature of 900° C. and 2 hours for the crystallization temperatures of 950° C. and 1,000° C. The glass-ceramics were then ion-exchanged in a molten salt bath containing $NaNO_3$ at 390° C. for 3.5 hours to form a compressive stress layer. FIG. 9 shows the Vickers indentation fracture threshold in kgf for each glass ceramic. As can be seen, Vickers indentation fracture thresholds up to about 40 kgf were achieved.

Example 7

Figure 10:
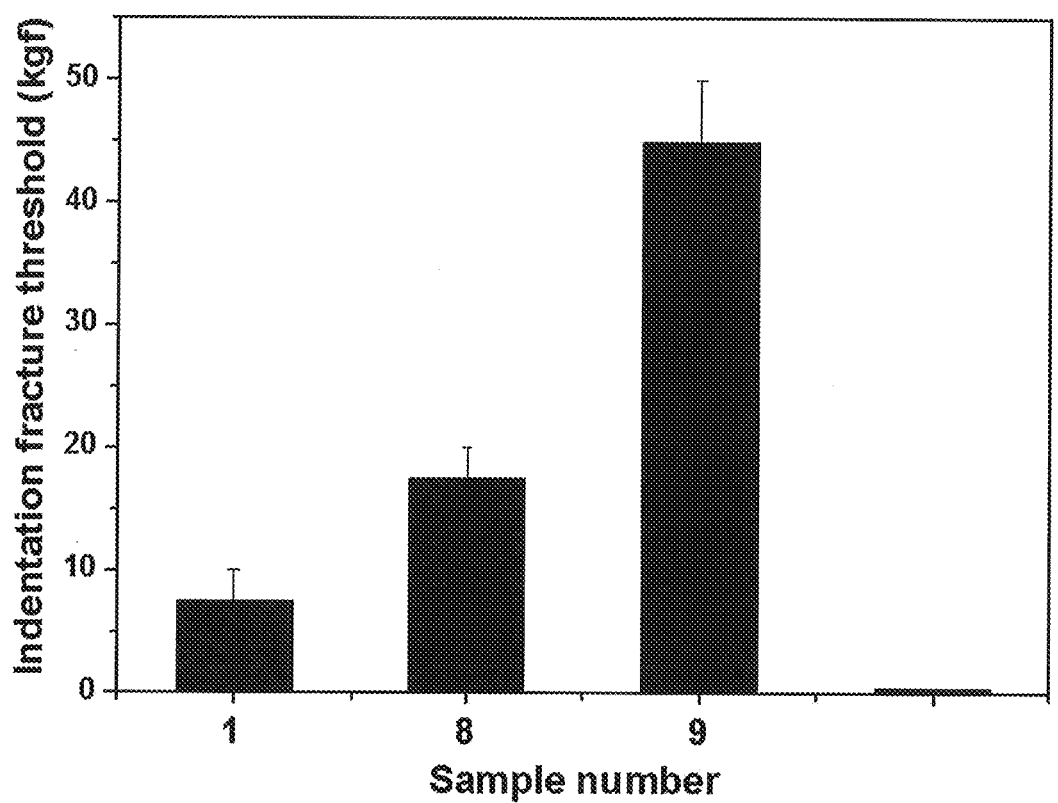
FIG. 10 shows the Vickers indentation fracture threshold in kgf for exemplary glass-ceramics.

Compositions 8 and 9 were heated to a nucleation temperature of 780° C. and maintained at the nucleation temperature for 2 hours. Then each of compositions 8 and 9 were heated to a crystallization temperature of 975° C. at a rate of 5° C./min and held at the crystallization temperature for 4 hours. The glass-ceramics were then ion-exchanged in a molten salt bath containing NaNO$_3$ at 390° C. for 3.5 hours to form a compressive stress layer. FIG. 10 shows the Vickers indentation fracture threshold in kgf for each glass-ceramic. As can be seen, Vickers indentation fracture thresholds up to about 50 kgf were achieved.

Example 8

Figure 11:
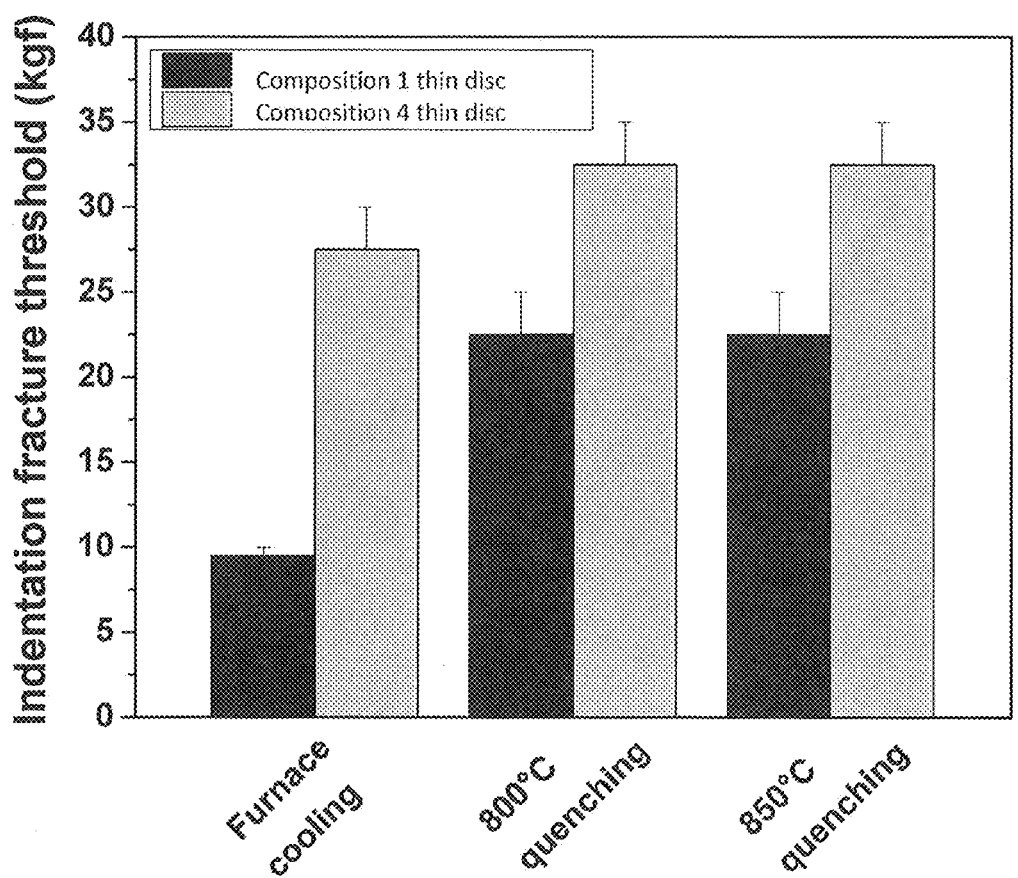
FIG. 11 shows the Vickers indentation fracture threshold in kgf for exemplary glass-ceramics.

Three samples of each of compositions 1 and 10 were heated to a nucleation temperature of 780° C. and maintained at the nucleation temperature for 2 hours. Then the compositions were heated to a crystallization temperature of 975° C. at a rate of 5° C./min and held at the crystallization temperature for 4 hours. One glass-ceramic sample of each of compositions 1 and 10 was cooled in a furnace at a controlled rate, one glass-ceramic sample of each of compositions 1 and 10 was cooled by quenching from 800° C. to room temperature, and one glass-ceramic sample of each of compositions 1 and 10 was cooled by quenching from 850° C. to room temperature. An electric fan was used in the quenching process with an average cooling rate of 300 to 500° C./min. All glass-ceramics were then ion-exchanged in a molten salt bath containing NaNO$_3$ at 390° C. for 3.5 hours to form a compressive stress layer. FIG. 11 shows the Vickers indentation fracture threshold in kgf for each glass-ceramic. As can be seen, quenching by cooling led to higher Vickers indentation fracture thresholds (up to about 35 kgf). It is believed that the fast cooling rate leads to a higher fictive temperature in the residual glass, and thus a higher Vickers indentation fracture threshold.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

We claim:

1. A glass-ceramic article comprising:
    a) a composition, in mole %, comprising:
    i) SiO$_2$ in a range from about 60 to about 75,
    ii) Al$_2$O$_3$ in a range from about 10 to about 18,
    iii) Li$_2$O in a range from about 5 to about 14, and
    iv) B$_2$O$_3$ in a range from about 10 to about 20,
    wherein a ratio of the mole sum total [Li$_2$O+Na$_2$O+K$_2$O+MgO+ZnO]/moles of [Al$_2$O$_3$] is in a range from about 0.8 to about 1.5; and
    b) a Vickers crack initiation threshold of a least about 25 kgf. wherein β-spodumene is the predominant crystalline phase.

2. The glass-ceramic article of claim 1, wherein the Vickers crack initiation threshold is at least about 30 kgf.

3. The glass-ceramic article of claim 1, wherein the Vickers crack initiation threshold is at least about 35 kgf.

4. The glass-ceramic article of claim 1, wherein the Vickers crack initiation threshold is at least about 40 kgf.

5. The glass-ceramic article of claim 1, wherein the Vickers crack initiation threshold is at least about 45 kgf.

6. The glass-ceramic article of claim 1, wherein at least about 50% of the B$_2$O$_3$ present in a residual glass comprises three-fold coordination boron cations.

7. The glass-ceramic article of claim 1, wherein the composition further comprises:
    v) MgO in a range from 0 to about 8,
    vi) ZnO in a range from 0 to about 4,
    vii) TiO$_2$ in a range from about 2 to about 5,
    viii) Na$_2$O in a range from 0 to about 5,
    ix) K$_2$O in a range from 0 to about 4, and
    x) SnO$_2$ in a range from about 0.05 to about 0.5.

8. The glass-ceramic article of claim 1, wherein the composition, in mole %, comprises:
    i) SiO$_2$ in a range from about 60 to about 70,
    ii) Al$_2$O$_3$ in a range from about 10 to about 16,
    iii) Li$_2$O in a range from about 7 to about 10,
    iv) B$_2$O$_3$ in a range from about 6 to about 8,
    v) MgO in a range from about 2 to about 5,
    vi) ZnO in a range from about 1 to about 2,
    vii) TiO$_2$ in a range from about 3 to about 4,
    viii) Na$_2$O in a range from about 0.4 to about 0.6, and
    ix) SnO$_2$ in a range from about 0.2 to about 0.5.

9. The glass-ceramic article of claim 1, wherein the composition comprises B$_2$O$_3$ in a range from about 6 to about 10 mole %.

10. The glass-ceramic article of claim 1, wherein the composition comprises B$_2$O$_3$ in a range from about 6 to about 8 mole %.

11. The glass-ceramic article of claim 1, wherein the composition comprises ZrO$_2$ in a range from 0 to about 3 mole %.

12. The glass-ceramic article of claim 1, wherein the glass-ceramic article comprises a color presented in CIELAB color space coordinates for an observer angle of 10° and a CIE illuminant F02 determined from reflectance spectra measurements using a spectrophotometer with specular reflectance included comprising:
    a) CIE a* in a range from about −2 to about 1;
    b) CIE b* in a range from about −5 to about −2; and
    c) CIE L* in a range from about 80 to about 98.

13. The glass-ceramic article of claim 1, further comprising a compressive stress layer formed by ion-exchange.

14. The glass-ceramic article of claim 13, wherein the compressive stress layer has a compressive stress of at least 80 MPa and a depth of layer (DOL) of at least about 2% of an overall thickness of the article.

15. An electronic device comprising the glass-ceramic article of claim 1.

16. A glass-ceramic article comprising:
    a) a composition, in mole %, comprising:
    i) SiO$_2$ in a range from about 60 to about 75,
    ii) Al$_2$O$_3$ in a range from about 10 to about 18,
    iii) Li$_2$O in a range from about 5 to about 14,
    iv) B$_2$O$_3$ in a range from about 8 to about 20,
    v) TiO$_2$ in a range from about 2 to about 5, and
    vi) SnO$_2$ in a range from about 0.05 to about 0.5; and
    b) a Vickers crack initiation threshold of a least about 25 kgf,
    wherein β-spodumene is the predominant crystalline phase.

17. The glass-ceramic article of claim 16, wherein the composition further comprises:
    vii) MgO in a range from 0 to about 8,
    viii) ZnO in a range from 0 to about 4,
    ix) Na$_2$O in a range from 0 to about 5, and
    x) K$_2$O in a range from 0 to about 4.

18. The glass-ceramic article of claim 16, wherein the Vickers crack initiation threshold is at least about 30 kgf.

19. The glass-ceramic article of claim 16, wherein the Vickers crack initiation threshold is at least about 35 kgf.

20. The glass-ceramic article of claim 16, wherein the Vickers crack initiation threshold is at least about 40 kgf.

21. The glass-ceramic article of claim 16, wherein the Vickers crack initiation threshold is at least about 45 kgf.

22. The glass-ceramic article of claim 16, wherein at least about 50% of the $B_2O_3$ present in a residual glass comprises three-fold coordination boron cations.

23. The glass-ceramic article of claim 16, wherein the composition comprises $ZrO_2$ in a range from 0 to about 3 mole %.

24. The glass-ceramic article of claim 16, wherein the glass-ceramic article comprises a color presented in CIELAB color space coordinates for an observer angle of 10° and a CIE illuminant F02 determined from reflectance spectra measurements using a spectrophotometer with specular reflectance included comprising:
   a) CIE a* in a range from about −2 to about 1;
   b) CIE b* in a range from about −5 to about −2; and
   c) CIE L* in a range from about 80 to about 98.

25. The glass-ceramic article of claim 16, further comprising a compressive stress layer formed by ion-exchange.

26. The glass-ceramic article of claim 25, wherein the compressive stress layer has a compressive stress of at least 80 MPa and a depth of layer (DOL) of at least about 2% of an overall thickness of the article.

27. An electronic device comprising the glass-ceramic article of claim 16.

28. The glass-ceramic article of claim 16, wherein a ratio of the mole sum total $[Li_2O+Na_2O+K_2O+MgO+ZnO]$/moles of $[Al_2O_3]$ is in a range from about 0.8 to about 1.5.

* * * * *